United States Patent [19]
Fung et al.

[11] Patent Number: 5,337,408
[45] Date of Patent: Aug. 9, 1994

[54] MULTI-LEVEL DISPLAY CONTROLLER

[75] Inventors: Henry T. Fung; Siu K. Tsang, both of San Jose; Ralph A. Woodward, Mountain View, all of Calif.

[73] Assignee: Vadem Corporation, San Jose, Calif.

[21] Appl. No.: 815,928

[22] Filed: Dec. 30, 1991

Related U.S. Application Data

[63] Continuation-in-part of Ser. No. 744,710, Aug. 9, 1991.

[51] Int. Cl.⁵ .............................................. G06F 3/00
[52] U.S. Cl. ................................. 395/162; 395/118; 345/10; 345/112; 345/149
[58] Field of Search ............... 395/162, 132, 118, 126; 340/720, 723, 732, 752; 345/10, 112, 149

[56] References Cited

U.S. PATENT DOCUMENTS 5,221,971  6/1993  Allen et al. ........................ 358/459

Primary Examiner—Robert L. Richardson
Attorney, Agent, or Firm—Fliesler, Dubb, Meyer & Lovejoy

[57] ABSTRACT

Disclosed is a computer having a display controller for controlling a display where the display provides an image with different selectable gray scale levels. The display controller includes a pattern unit for providing modulation patterns. The modulation patterns include patterns each formed of sequences of different numbers of both 1's and 0's that are not phase related. The display controller additionally includes a modulation unit, operable over the sequential frames, for modulating the data values of pixels with the patterns whereby the intensity level of the pixels over the sequential frames is controlled as a function of the data value of the pixels and as a function of the patterns.

38 Claims, 8 Drawing Sheets

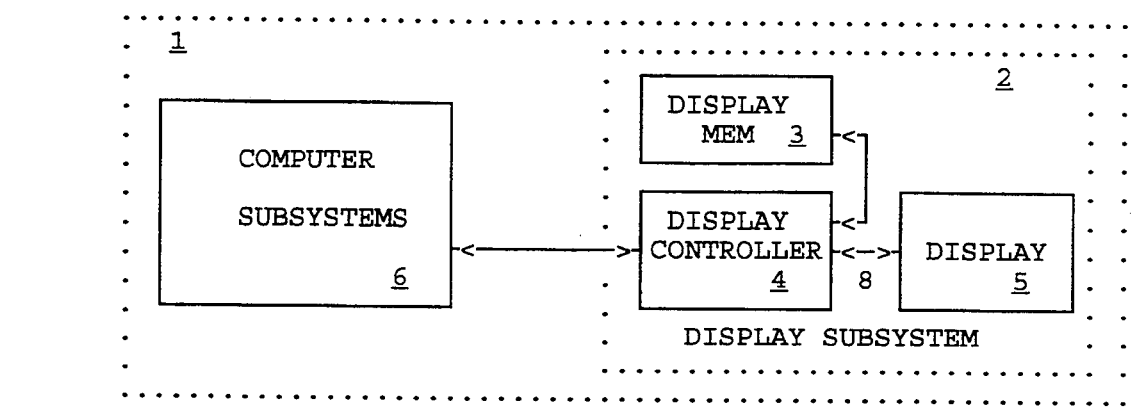
FIG. 1
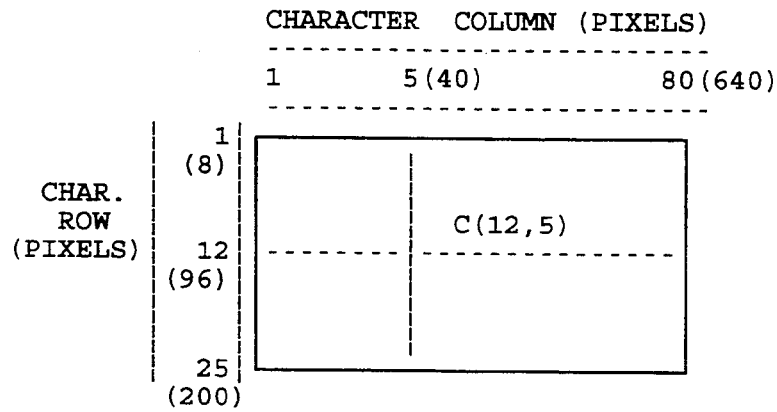
FIG. 2
FIG. 3
FIG. 4

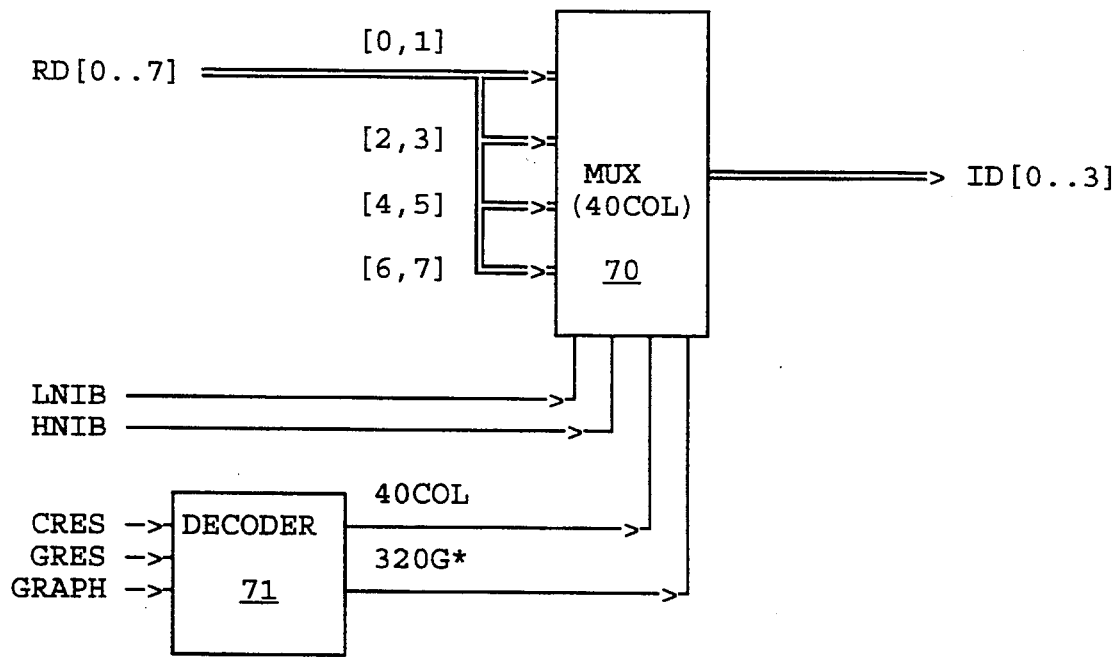
FIG. 11
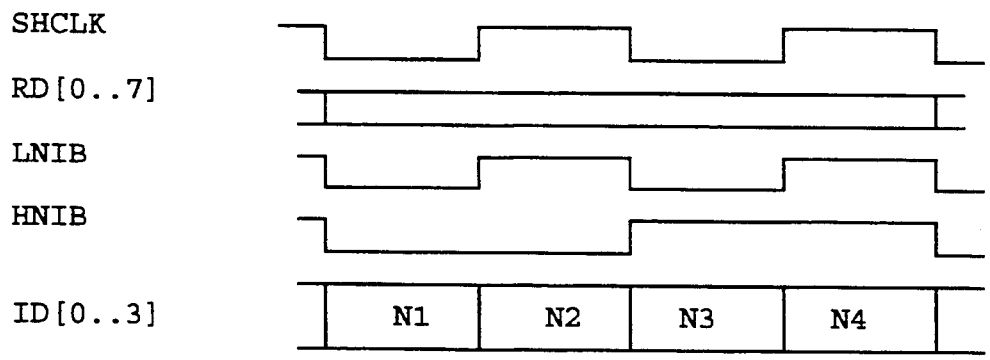
FIG. 12
| OUTPUT NIBBLE | ID[0..3] | | | |
|---|---|---|---|---|
| | 0 | 1 | 2 | 3 |
| N1 | RD6 | RD6 | RD7 | RD7 |
| N2 | RD4 | RD4 | RD5 | RD5 |
| N3 | RD2 | RD2 | RD3 | RD3 |
| N4 | RD0 | RD0 | RD1 | RD1 |
FIG. 13

MULTI-LEVEL DISPLAY CONTROLLER

This application is a continuation-in-part of the application.

BACKGROUND OF THE INVENTION

Field Of the Invention

The present invention relates to the field of computer displays and more particularly to displays that provide images having different gray scale levels.

A computer display, such as a liquid crystal display (LCD), provides an image as an array, P, of pixels, $p_{ij}$. Each pixel has a pre-determined location in the array determined by the "i" and "j" coordinates. For an array with I rows and J columns, the image P is defined as follows:

| $p_{1,1}$ | $p_{1,2}$ | $p_{1,3}$ | . | . | . | $p_{1,J}$ |
|---|---|---|---|---|---|---|
| $p_{2,1}$ | $p_{2,2}$ | $p_{2,3}$ | | | | |
| $p_{3,1}$ | $p_{3,3}$ | $p_{3,3}$ | | | | |
| . | | | | | | |
| . | | | | | | |
| $p_{I,1}$ | $p_{I,2}$ | $p_{I,3}$ | | | | $p_{I,J}$ |

The image P can be the entire screen of pixels where for a typical LCD display I equals 200 rows and J equals 640 columns of pixels. Similarly, the image P can be a single character which is a part of the entire screen of pixels where for a typical LCD display character I equals 8 rows and J equals 8 columns of pixels.

Each pixel, $p_{ij}$, in the array for image P has a selectable data value (for example, "on" being binary 1 and "off" being binary 0). The composite data values of all pixels in the array define the image as an array of binary 1's and 0's. When that image is output to a computer display, the image is perceivable by human eyes.

Images are presented in sequential frames where each frame refreshes the image for human viewing at a refresh frame rate that is faster than can be detected by human eyes. Each frame has binary 1 or binary 0 data values for each of the pixels in the image. The i,j location of each pixel in the array is the same from frame to frame so that if the data values for each frame are not changed, the image is not changed. When the data values of pixels are changed, the image is changed.

Pixels that are on (binary 1) over a number of sequential frames provide images that appear to have a single intensity level of one value (black) while pixels that are off (binary 0) over a number of sequential frames provide images that appear to have a single intensity level of an opposite value (white).

In order to provide images that appear to human viewers to have different levels of intensity (shades of gray, gray scale levels), pixels that have data values that are normally on over a number of sequential frames are modulated to be on part of the time and off part of the time. The sequential frames over which data values of pixels are modulated for gray scale are called frame sets. Frame sets repeat one after another.

The number, F, of frames in a frame set can be any value but values between 4 and 256 frames are usual. In one example, F equals 8 and hence the modulation pattern repeats every eight frames. Over F frames, the image P is modulated by a scale pattern U which modulates each pixel, $p_{ij}$, in the image P for each frame, f, with a scale pattern value, $u_f$, to produce the modulated image U*P having modulated pixel values $u_f*p_{ij}$. The "*" is a modulation operator which is, for example, the logical AND of $u_f$ with $p_{ij}$. The modulated image, U*P, for frame f is given as follows:

| $u_f*p_{1,1}$ | $u_f*p_{1,2}$ | $u_f*p_{1,3}$ | . | . | . | $u_f*p_{1,J}$ |
|---|---|---|---|---|---|---|
| $u_f*p_{2,1}$ | $u_f*p_{2,2}$ | $u_f*p_{2,3}$ | | | | |
| $u_f*p_{3,1}$ | $u_f*p_{3,3}$ | $u_f*p_{3,3}$ | | | | |
| . | | | | | | |
| . | | | | | | |
| $u_f*p_{I,1}$ | $u_f*p_{I,2}$ | $u_f*p_{I,3}$ | | | | $u_f*p_{I,J}$ |

The gray scale levels for the modulated image U*P are determined by the scale pattern U. U has different values for different frames f in the frame set, F. In an example with a frame set of eight (F=8), the eight display frames are denoted by f=1, 2, 3, . . . , 8 and the values of U, one for each frame, are $u_1$, $u_2$, $u_3$, $u_4$, $u_5$, $u_6$, $u_7$, $u_8$.

A number of different gray scale levels are possible. In one example with eight gray scale levels, the first level U1 is "white" so that the normally on pixel is modulated to be off (binary 0) over all eight frames of the frame set. In the example, U1 has the values $u_1$, $u_2$, $u_3$, $u_4$, $u_5$, $u_6$, $u_7$, $u_8$ all equal to 0 (0/8 modulation). That is, $u_1=0$, $u_2=0$, $u_3=0$, and so on whereby the scale pattern U1 is 00000000. In the example, the second level of gray allows the normally on pixel to be on for only one out of eight frames (⅛ modulation) so that a scale pattern for U2 is, for example, 10000000. The third level allows the pixel to be on two out of eight frames (2/8 modulation) so that a scale pattern U3 is, for example, 10001000. In a similar manner, gray scale levels are established by scale patterns U4, U5, U6, U7, U8 that have still different numbers of 1's and 0's (for example, 4/8, 5/8, 7/8 and 8/8 modulation).

Pixel modulation for a selected gray scale level occurs over the frame set using any selected one of the scale patterns U1, U2, U3, U4, US, U6, U7, US. After the frame set completes, the gray scale modulation begins again for the next frame set and so on for each subsequent frame set.

If a first pixel, $P_{ij}$, of an image is modulated over the frame set with one scale pattern, such as U1, and a second pixel $p_{ij+1}$ in a location adjacent to the first pixel is also modulated over the frame set with the same scale pattern, U1, the modulation also produces an adjacent-pixel low frequency modulation component between the pixels $P_{ij}$ and $P_{ij+1}$. For the U1 example where 1 of 8 pixels is on over the frame set, the adjacent-pixel low frequency modulation component is equal to ⅛ times the operating frequency. For an operating frequency of 60Hz, the low frequency component is equal to 7.5Hz and this low frequency component produces flicker in the display image that is observable by and disturbing to human eyes.

To minimize the flicker, U.S. Pat. No. 4,760,387 employs identical waveforms for modulating adjacent pixels, but the waveforms are phase-shifted so that the on time for two adjacent pixels having the same grey level are not coincident. The two waveforms essentially represent two phase-shifted scale patterns, U and Z, for modulating the adjacent pixels.

The modulation of the image P, having parts $P^1$ and $P^2$ where $P^1$ is formed of pixels $P_{i,j}$ and where $P^2$ is formed of adjacent pixels $P_{ij+1}$ can be expressed as U*$P^1$Z*$P^2$ UZ* where Z is a phase shifted copy of U.

The $U*P^1, Z*P^2$ array of modulated pixels for a frame f is given as follows:

$$\begin{array}{ccccc}
u_f*p_{1,1} & z_f*p_{1,2} & u_f*p_{1,3} & \cdots & z_f*p_{1,J} \\
z_f*p_{2,1} & u_f*p_{2,2} & z_f*p_{2,3} & & \\
u_f*p_{3,1} & z_f*p_{3,2} & u_f*p_{3,3} & & \\
\vdots & & & & \\
z_f*p_{I,1} & u_f*p_{I,2} & z_f*p_{I,3} & & u_f*p_{I,J}
\end{array}$$

In the $U*P^1 Z*P^2$ array typical values for U1, U2, U3, U4, U5, U6, U7, U8 each with bits $u_1$, $u_2$, $u_3$, $u_4$, $u_5$, $u_6$, $u_7$, $u_8$ are given above. Corresponding values of scale patterns Z1, Z2, Z3, Z4, Z5, Z6, Z7, Z8 with bits $z_1$, $z_2$, $z_3$, $z_4$, $z_5$, $z_6$, $z_7$, $z_8$ are determined by phase shifting the U1, U2, U3, U4, U5, U6, U7, U8 scale patterns. For example, the scale pattern Z1 is 00000000, the scale pattern Z2 is 00001000, the scale pattern Z3 is 00100010, and so on for Z4, Z5, Z5, Z7, Z8.

A phase shift of identical waveforms, identical scale patterns such as U and Z discussed above, beneficially tends to increase the minimum value of the adjacent-pixel modulation frequency and hence tends to reduce flicker. For example, the U2 pattern 10000000 and the phase-shifted Z2 pattern 00001000 when used to modulate adjacent pixels tends to beneficially double the adjacent-pixel modulation frequency because a 1 will appear in one or the other of the patterns U2 or Z2 every 4 bits (a ¼ modulation). When identical patterns U2 and U2 are employed (10000000 and 10000000), a 1 will appear in each of the the patterns once every 8 bits (a ⅛ modulation). The phase-shifted patterns provide a ¼ modulation which for a 60Hz system is 15Hz, twice as good as the identical patterns with ⅛ modulation which for a 60Hz system is 7.5Hz.

Although the use of phase-shifted patterns tends to reduce flicker, the amount of flicker with a 15Hz frequency inherent in the phase-shift method is still quite noticeable.

It has been determined that human eyes tend to respond adversely to adjacent-pixel modulation frequencies that are below 30Hz. Accordingly, in order to prevent flicker due to adjacent-pixel modulation, the apparent minimum adjacent-pixel modulation frequency should not be less than 30Hz. The phase-shift method of U.S. Pat. No. 4,760,387 cannot guarantee that the minimum adjacent-pixel modulation frequency will not be less than 30Hz and hence an improved modulation method is needed.

When LCD displays employ gray scale modulation, a problem with charge accumulation arises. Each of the LCD pixel elements that is on tends to accumulate a charge when the polarity of the signal driving the LCD is applied in a single direction. In order to avoid charge accumulation, a charge modulation signal (M signal) is typically applied to the pixel elements. The charge modulation signal (M signal) alternates the polarity and the direction of the driving signal to the pixels. Accordingly, for a pixel element that is on for a number of frames, the charge accumulation for a driving signal of one polarity in one direction for one or more frames tends to be cancelled by the charge accumulation of a driving signal of opposite polarity in the opposite direction for the next one or more frames.

For a pixel, $P_{i,j}$ that is on, the polarity $m_f$ of the M signal modulates the pixel over a frame set, first with a "+" and then with a "−" polarity. For f=1, 2, 3, ..., 8 frames, $m_f$ has a polarity pattern, M, as follows:

$$M = + - + - + - + -$$

For a pixel that has a data value 1 for all 8 frames in a frame set, the accumulating charge, AcC, accumulates to a net charge, NetC, of zero because there are an equal number of positive (4+) and negative (4−) values.

| | | | | | | | | |
|---|---|---|---|---|---|---|---|---|
| M = | + | − | + | − | + | − | + | − |
| $P_{I,J}$ | 1 | 1 | 1 | 1 | 1 | 1 | 1 | 1 |
| AcC | + | − | + | − | + | − | + | − 4+, 4− |
| NetAc | 0 | | | | | | | |

For a pixel that has a data value 1 for all 8 frames and is modulated by a scale pattern 10101010 (to produce a 4/8 gray scale modulation), the accumulating charge, AcC, accumulates to a net charge, NetC, of 4+ because there are unequal numbers of positive (4+) and negative (0−) charge values as follows.

| | | | | | | | | |
|---|---|---|---|---|---|---|---|---|
| M = | + | − | + | − | + | − | + | − |
| $P_{I,J}$ | 1 | 1 | 1 | 1 | 1 | 1 | 1 | 1 |
| U6 | 1 | 0 | 1 | 0 | 1 | 0 | 1 | 0 |
| AcC | + | | + | | + | | + 4+, 0− |
| NetC | 4+ | | | | | | | |

As indicated by the example above, the charge accumulation problem arises when scale patterns are employed that can cross modulate with the charge modulation M signal to produce an unequal number of positive and negative charges for a pixel over a period of time. The phase-shift method does not solve the charge accumulation problem and hence there is a need for improvement.

In accordance with the above background, there is a need for an improved display controller and computer system having an improved modulation method.

SUMMARY OF THE INVENTION

The present invention is a display controller for controlling a display where the display provides an image with different selectable gray scale levels. The image is formed of an array of pixels. The array of pixels is displayed in sequential frames. Each pixel has a data value that is repeated or changed in each frame.

The display controller includes a frame counter for establishing a frame set as a number of sequential frames. A data unit specifies the data value of each of the pixels in the array to define the image.

The display controller additionally includes a pattern unit for providing modulation patterns. The modulation patterns include patterns each formed of sequences of different numbers of both 1's and 0's that are not phase related.

The display controller additionally includes a modulation unit, operable over the sequential frames, for modulating the data values of pixels with the patterns whereby the intensity level of said pixels over the sequential frames is controlled as a function of the data value of the pixels and as a function of the patterns.

In a general embodiment, the pixel array, P, is partitioned into N pixel groups $P^1, P^2, \ldots, P^n, \ldots, P^N$ where each pixel group $P^n$ may have different values represented by $P^n_f$, in each frame, f, so that pixel groups for the pixel array P in frame f have the values $P^1_f, P^2_f, \ldots$ ., $P^n_f, \ldots, P^N_f$. In such an embodiment, the pattern unit provides the patterns U with modulation groups $U^1, U^2, \ldots, U^n, \ldots U^N$, each group having patterns having values, $u^n_f$, for each frame f, where the patterns include patterns each formed of sequences of different numbers of both 1's and 0's that are not phase related. The modulation unit forms the modulated image as U*P where "*" is an operator and where U*P is expressed as $U^1*P^1, U^2*P^2, \ldots, U^n*P^n, \ldots, U^N*P^N$.

In a general embodiment, the pattern unit provides each modulation group $U^n$ with a set of patterns $U^n1, U^n2, \ldots, U^ng, \ldots, U^nG$ where G is the number of patterns in the set for the group $U^ng$ where each pattern in a set $U^n$ has a different number of 1's and 0's to provide a different modulation and each pattern $U^ng$ in the set $U^n$ includes F pattern values $u^ng_1, u^ng_2, \ldots, u^ng_f, \ldots, u^ng_F$. In such embodiment, the modulation unit for each frame, f, forms the modulated image U*P with modulated pixel values $u^ng_f*(p_{i,j})^n_f$ where $(p_{i,j})^n_f$ is the data value of the pixel $p_{i,j}$ for the pixel array $p^n$ in the f frame and $u^ng_f$ is the binary 1 or binary 0 value of the $u_n g$ pattern in the f frame.

In a specific embodiment wherein N=2, the image pixel array P is formed of pixel groups $P^1$ and $P^2$ which are modulated by modulation groups $U^1$ and $U^2$ to form the modulated image $U^1*P^1, U^2*P^2$ wherein $U^2$ is represented by Z and $U^1$ is represented by U for clarity. The image P has pixel groups $P^1$ and $P^2$ where $P^1$ is formed of pixels $P_{i,j}$ and $p_{i+1,j+1}$ and where $P^2$ is formed of adjacent pixels $P_{i,j+1}$ and $P_{i+1,j+1}$ so that the modulation unit forms the modulation $U*P^1, Z*P^2$ designated as UZ*P.

In the embodiment where N=2, the pixels in the pixel array are organized to be modulated alternately by U and Z patterns. Specifically, the pixels at first locations, alternately interleaved with adjacent pixels at second locations, are modulated by a U scale pattern and the pixels at second locations, alternately interleaved with the adjacent pixels at the first locations, are modulated by a Z scale pattern.

The U and Z scale patterns form a set of scale patterns. For modulation over F frames, each of the U and Z scale patterns has F binary bits of 1's or 0's. The U scale patterns have no phase relationship to the Z scale patterns, but corresponding U and Z scale patterns each have the same number of 1's and the same number of 0's so that when modulated with the data value of a pixel, they produce the same gray scale level for the pixel.

In one embodiment, the modulated pixel array $Ug*P^1, Zg*P^2$ is further partitioned with the modulation patterns Ug and Zg partitioned into first patterns $^1Ug$ and $^1ZUg$ which tend to cause charge accumulation of one polarity and second inverse patterns $^2Ug$ and $^2Zg$, respectively, which tend to cause charge accumulation of the opposite polarity. The frame counter provides a reverse signal after a number of frames to establishes a charge set. The modulation unit modulates the pixel groups $P^1$ and $P^2$ during first and alternate charge sets with the first patterns $^1Ug$ and $^1Zg$ to form the modulated pixel array $^1Ug*P^1, ^1Zg*P^2$ and alternately in response to the reverse signal modulates the pixel groups $P^1$ and $P^2$ with the second patterns $^2Ug$ and $^2Zg$ to form the modulated pixel array $^2Ug*P^1, ^2Zg*P^2$.

In one embodiment, the frequencies of the modulating scale patterns in the set of patterns is not less than 15Hz so that the adjacent-pixel modulation frequency for any combination of scale patterns is always more than 30Hz so as to minimize flicker.

In one embodiment, scale patterns are stored in read-only memory (ROM) and are accessed during each frame to modulate the data values of the pixels of the array during each frame.

The foregoing and other objects, features and advantages of the invention will be apparent from the following detailed description in conjunction with the drawings.

BRIEF DESCRIPTION OF THE DRAWINGS

FIG. 1 is a block diagram of a computer system in accordance with the present invention.

FIG. 2 is a representation of a 80×25 array of characters representing the array of the FIG. 1 system.

FIG. 3 is a representation of an 8×8 array of pixels (64 pixels) representing the pixels for each one of the characters in the character array of FIG. 2.

FIG. 4 is a representation of the FIG. 3 8×8 array of pixels displayed for a "C" character.

FIG. 11 depicts a block diagram representative of the input multiplexer unit 69 of FIG. 7 in another mode of operation.

FIG. 12 depicts timing diagrams representative of the operation of the input multiplexer unit 69 in the FIG. 11 mode of operation.

FIG. 13 depicts the contents of the nibble bits for the input multiplexer unit 69 in the FIG. 11 and FIG. 12 mode of operation.

DETAILED DESCRIPTION

General Nomenclature

Figure 5:
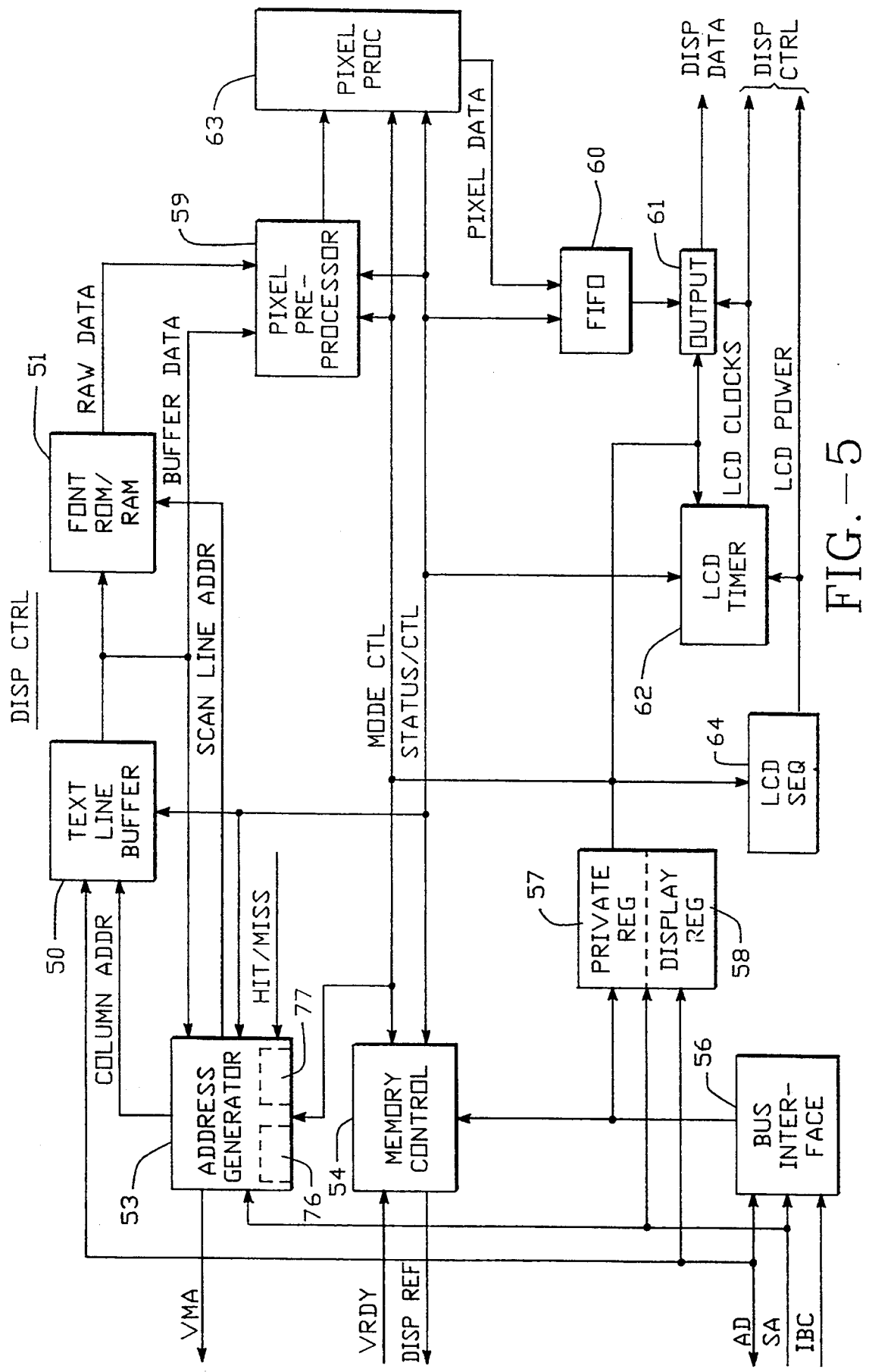
FIG. 5 is a block diagram of the display controller within the system of FIG. 1.

In the present invention, a computer display, such as a liquid crystal display (LCD), provides an image as an array, P, of pixels, $P_{i,j}$. Each pixel has a pre-determined location in the array determined by the "i" and "j" coordinates. For an array with I rows and J columns, the image P is defined as follows:

| | | | | | | |
|---|---|---|---|---|---|---|
| $P_{1,1}$ | $P_{1,2}$ | $P_{1,3}$ | . | . | . | $P_{1,J}$ |
| $P_{2,1}$ | $P_{2,2}$ | $P_{2,3}$ | | | | |
| $P_{3,1}$ | $P_{3,3}$ | $P_{3,3}$ | | | | |
| . | | | . | | | |
| . | | | | . | | |
| . | | | | | . | |
| $P_{I,1}$ | $P_{I,2}$ | $P_{I,3}$ | | | | $P_{I,J}$ |

Each pixel, $P_{i,j}$, in the array for image P has a selectable data value (for example, "on" represented by binary 1 and "off" represented by binary 0). Images P are presented in sequential frames where F is the number of frames in a frame set and where P is represented by $P_1$, $P_2$, ..., $P_f$, ..., $P_F$ to represent the value of P in each frame, f, of the F frames.

Modulation patterns U have pattern values, $u_f$, for the frame f so that the modulated image $U*P$ for the frame f has modulated pixel values $u_f*(p_{i,j})_f$ where $(p_{i,j})_f$ is the value of $P_{i,j}$ for the f frame.

The pixel array P is partitioned into N pixel groups $P^1, P^2, ..., P^n, ..., P^N$. Each pixel group $P^n$ may have different values in each frame f represented by $p^n{}_f$, so that groups for the pixel array P in frame f have the values $p^1{}_f, p^2{}_f, ..., p^n{}_f, ..., p^N{}_f$.

The pixel array P is modulated by modulation groups U where for n=N, U has the groups $U^1, U^2, ..., U^n, ..., U^N$. The modulated image, is $U*P$ where "*" is an operator and where $U*P$ is expressed as $U^1*P^1, U^2*P^2, ..., U^n*P^n, ..., U^N, P^N$. Each modulation group $U^n$ has a set of patterns $U^n1, U^n2, ..., U^ng, ..., U^nG$ where G is the number of patterns in the set for the group $U^n$. Each pattern in a set $U^ng$ has a different number of 1's and 0's to provide a different modulation. Each pattern $U^ng$ in the set $U^n$ includes F pattern values $u^ng_1, u^ng_2, ..., u^ng_f, ..., u^ng_F$.

For each frame f, the modulated image $U*P$ has modulated pixel values $u^ng_f*(p_{ij})^n{}_f$ where $(p_{ij})^n{}_f$ is the data value of the pixel $P_{ij}$ for the pixel array $P^n$ in the f frame and $u^ng_f$ is the binary 1 or binary 0 value of the $u^ng$ pattern in the f frame.

In one embodiment N=2 and the image pixel array P is formed of pixel groups $P^1$ and $P^2$ which are modulated by modulation groups $U^1$ and $U^2$ to form the modulated image $U^1*P^1, U^2*P^2$. For clarity, where N=2, $U^2$ is represented by Z and $U^1$ is represented by U. The modulation of the image P, having pixel groups $P^1$ and $P^2$ where $P^1$ is formed of pixels $P_{ij}$ and $P_{i+ij+1}$ and where $P^2$ is formed of adjacent pixels $P_{ij+1}$ and $p_{ij+ij}$ can be expressed as $U*P^1, Z*P^2$, or as $UZ*P$. The $U*P^1, Z*P^2$ array of modulated pixels for a frame f is given as follows:

| | | | | | | |
|---|---|---|---|---|---|---|
| $u_f*p_{1,1}$ | $z_f*p_{1,2}$ | $u_f*p_{1,3}$ | . | . | . | $z_f*p_{1,J}$ |
| $z_f*p_{2,1}$ | $u_f*p_{2,2}$ | $z_f*p_{2,3}$ | | | | |
| $u_f*p_{3,1}$ | $z_f*p_{3,2}$ | $u_f*p_{3,3}$ | | | | |
| . | | | | | | |
| . | | | | | | |
| $z_f*p_{I,1}$ | $u_f*p_{I,2}$ | $z_f*p_{I,3}$ | | | | $u_f*p_{I,J}$ |

The $U*P^1, Z*P^2$ array of modulated pixels for a frame set F as a function of frame f for particular scale patterns $Ug_f$ and $Zg_f$ each having gray scale modulations $Ug*P^1, Zg*P^2$ is given as follows:

| | | | | | | |
|---|---|---|---|---|---|---|
| $Ug_f*p_{1,1}$ | $Zg_f*p_{1,2}$ | $Ug_f*p_{1,3}$ | . | . | . | $Zg_f*p_{1,J}$ |
| $Zg_f*p_{2,1}$ | $Ug_f*p_{2,2}$ | $Zg_f*p_{2,3}$ | | | | |
| $Ug_f*p_{3,1}$ | $Zg_f*p_{3,2}$ | $Ug_f*p_{3,3}$ | | | | |
| . | | | | | | |
| . | | | | | | |
| $Zg_f*p_{I,1}$ | $Ug_f*p_{I,2}$ | $Zg_f*p_{I,3}$ | | | | $Ug_f*p_{I,J}$ |

In order to avoid the charge accumulation problem, the modulated pixel array $Ug*P^1, Zg*P^2$ is further partitioned. The modulation patterns Ug and Zg are partitioned into first patterns $^1Ug$ and $^1ZUg$ which tend to cause charge accumulation of one polarity and second inverse patterns $^2Ug$ and $^2Zg$, respectively, which tend to cause charge accumulation of the opposite polarity. The pixel array P formed of the pixel groups $P^1$ and $P^2$ are modulated for a charge set (for example 256 frames) with the first patterns $^1Ug$ and $^1Zg$ to form the modulated pixel array $^1Ug*P^1, ^1Zg*P^2$ as follows:

| | | | | | | |
|---|---|---|---|---|---|---|
| $^1Ug_f*p_{1,1}$ | $^1Zg_f*p_{1,2}$ | $^1Ug_f*p_{1,3}$ | . | . | . | $^1Zg_f*p_{1,J}$ |
| $^1Zg_f*p_{2,1}$ | $^1Ug_f*p_{2,2}$ | $^1Zg_f*p_{2,3}$ | | | | |
| $^1Ug_f*p_{3,1}$ | $^1Zg_f*p_{3,2}$ | $^1Ug_f*p_{3,3}$ | | | | |
| . | | | | | | |
| . | | | | | | |
| $^1Zg_f*p_{I,1}$ | $^1Ug_f*p_{I,2}$ | $^1Zg_f*p_{I,3}$ | | | | $^1Ug_f*p_{I,J}$ |

Thereafter in alternate charge sets, the pixel array P, formed of the pixel groups $P^1$ and $P^2$ is modulated for a charge set (for example 256 frames) with the second patterns $^2Ug$ and $^2Zg$ to form the modulated pixel array $^2Ug*P^1, ^2Zg*P^2$ as follows:

| | | | | | | |
|---|---|---|---|---|---|---|
| $^2Ug_f*p_{1,1}$ | $^2Zg_f*p_{1,2}$ | $^2Ug_f*p_{1,3}$ | . | . | . | $^2Zg_f*p_{1,J}$ |
| $^2Zg_f*p_{2,1}$ | $^2Ug_f*p_{2,2}$ | $^2Zg_f*p_{2,3}$ | | | | |
| $^2Ug_f*p_{3,1}$ | $^2Zg_f*p_{3,2}$ | $^2Ug_f*p_{3,3}$ | | | | |
| . | | | | | | |
| . | | | | | | |
| $^2Zg_f*p_{I,1}$ | $^2Ug_f*p_{I,2}$ | $^2Zg_f*p_{I,3}$ | | | | $^2Ug_f*p_{I,J}$ |

The alternation of the modulated pixel array $^1Ug*P^1, ^1Zg*P^2$ with the modulated pixel array $^2Ug*P^1, ^2Zg,P^2$ over charge sets tends to cancel the charge accumulation to 0.

Computer—FIG. 1

In FIG. 1, computer 1 includes all of the computer subsystems 6 for computer 1 together with display subsystem 2. The display subsystem 2 includes a display memory 3, a display controller 4 and a display 5. The display subsystem 2 typically operates in one of the well-known display modes CGA, EGA, VGA or other. The CGA mode is described in a typical example for LCD displays.

For the CGA mode of operation, the display image (the visual image provided by display 5 of FIG. 1) is 80 character columns (640 pixels) in the horizontal X-axis direction and 25 character rows (200 pixels) in the vertical Y-axis direction as represented in FIG. 2. The 80×25 character image (2000 characters) of FIG. 2 is formed by a 640×200 pixel image (128,000 pixels). The FIG. 2 pixel image P is represented by an array of pixels, where

| | | | | | |
|---|---|---|---|---|---|
| $P_{1,1}$ | $P_{1,2}$ | $P_{1,3}$ | . . . | | $P_{1,J}$ |
| $P_{2,1}$ | $P_{2,2}$ | $P_{2,3}$ | | | |
| $P_{3,1}$ | $P_{3,3}$ | $P_{3,3}$ | | | |
| . | | | . | | |
| . | | | | | |
| . | | | | | |
| $P_{I,1}$ | $P_{I,2}$ | $P_{I,3}$ | | | $P_{I,J}$ |

The pixel image P can be the entire screen of pixels of any size as represented by FIG. 2, for example, where I equals 200 rows and J equals 640 columns of pixels.

Each of the 2000 characters in the FIG. 2 pixel image is formed by an 8×8 matrix of pixels as represented in FIG. 3. The pixel image P, when representing a single character from the image of FIG. 2, in one example, has I equal to 8 rows and J equal to 8 columns of pixels. Each character image is of the form:

| | | | | | |
|---|---|---|---|---|---|
| $P_{I,J}$ | $P_{I,J+1}$ | $P_{I,J+2}$ | . . . | | $P_{I,J+7}$ |
| $P_{I+1,J}$ | $P_{I+1,J+1}$ | $P_{I+1,J+2}$ | | | |
| $P_{I+2,J}$ | $P_{I+2,J+1}$ | $P_{I+2,J+2}$ | | | |
| . | | | . | | |
| . | | | | | |
| . | | | | | |
| $P_{I+7,J}$ | $P_{I+7,J+1}$ | $P_{I+1,J+2}$ | | | $P_{I+7,J+7}$ |

The display memory 3 of FIG. 1 stores the 2000 character image of FIG. 2 and can be any memory such as a separate video memory or can be part of the main memory of the FIG. 1 computer. A video memory as a part of the main memory of a computer is described in the above-identified cross-referenced application.

In display memory 3, two bytes of data are stored for each of the 2000 characters in the 80×25 character array of FIG. 2 so that display memory 3 stores 4000 bytes of data. The display subsystem 2 typically operates in text mode or in graphic mode. For each character in text mode operation, one of the two bytes per character is encoded data representing the text character and the other byte represents character attributes for the text character.

In operation, the display controller 4 repeatedly accesses the display memory 3 through operation of the computer subsystems 6 to obtain all 4000 bytes of data for all 2000 characters for the character array of FIG. 2. For each text character, display controller 4 decodes the encoded data for the text character to form the 64 pixels representing the character and outputs those 64 pixels over lines 8 to the display 5 of FIG. 1 to paint the visual image for that character. After completing the operation for 4000 bytes (2000 characters), display controller 34 repeats the operation over and over again so that the visual image is continuously repainted. From time to time, in a well known manner, application programs write new data into the display memory 3 and in this way the visual image becomes changed when display controller 4 paints the image to display 5.

In FIG. 2, a typical one of the characters C(12,5) is the character at character row 12 and character column 5. Character row 12 corresponds to pixel row 96 (occupying pixel rows 96 through 113) and character column 5 corresponds to pixel column 40 (occupying pixel columns 40 through 47).

As indicated in FIG. 3, each character such as the character C(12,5) in FIG. 2 is represented by a character pixel array of 64 pixels. A pixel is either on or off. In FIG. 3, each of the pixel locations is indicated by a "." signifying that the pixel is turned off (binary 0). A pixel is signified as being turned on (binary 1) by an "X".

In FIG. 4, the C(12,5) character of FIG. 2 is indicated, by way of example, as a "C" with certain of the pixels turned on (binary 1) as represented by "X's" to depict the shape of a character "C". Specifically, the pixels $P_{1,3}$, $P_{1,4}$, $P_{1,5}$, $P_{1,6}$ in the row 1 of FIG. 4 are turned on while the others in that row remain off (binary 0's). In the row 2, the pixels $P_{2,2}$, $P_{2,3}$, $P_{2,6}$, and $P_{2,7}$ are on (X) while the others are off (.). Similarly, certain pixels are on or off in the pixel rows 3 through 8 as shown in FIG. 4.

Display Controller—FIG. 5

In FIG. 5, further details of the display controller 4 of FIG. 1 are shown. The display controller 4 of FIG. 5, in one example, is like the display controller in FIG. 5 of the above-identified cross-referenced application except that FIFO 60 in FIG. 5 of the cross-referenced application is eliminated as not required for a synchronous embodiment described in the present application.

In FIG. 5, display controller 4 receives SA(0:25) addresses on the SA bus and receives or transmits data AD(0:7) to the subsystems 6 of FIG. 1 on the AD bus. Addresses of display data connect to the bus interface 56 which in turn provides addresses to the memory control 54. An address generator 53 generates an address, for the subsystems 6 of FIG. 1 or directly for display memory 3, whenever a memory access to the display memory 3 of FIG. 1 is required for display data. In order to reduce memory accesses, address generator 53 addresses 80 characters (160 bytes) at a time from memory 3. Eighty characters correspond to one character line in the display image of FIG. 2. Address generator 53 includes a character counter 76 for counting 160 bytes for providing the two-byte, 80-character column address to buffer 50. The character counter is incremented one byte for each byte increment on the address bus to synchronize transfer of data from memory 3 to buffer 50.

Address generator 53 includes a scan counter 77 for counting from 1 to 8 pixel scan lines to provide a pixel scan line count to font memory 51. The scan counter 77 is incremented once for each carry-out of the character counter 76. Accordingly, the first pixel scan line for each of the 80 characters in buffer 50 are obtained from font memory 51 and these are processed and output to the output 61. The second pixel scan line for each of the 80 characters in buffer 50 are obtained from font memory 51 and these are processed and output to the output 61. The process continues with the third through eighth pixel scan lines for each of the 80 characters in buffer 50 obtained from font memory 51 and processed and output to the output 61. After all eight scan lines are processed for all 80 characters, a new character line of 80 characters from buffer 50 is processed in the same manner.

Data to and from the memory 3 appears on the AD bus and is stored in a dual-line text line buffer 50. Accesses from the memory 3 are on an 80 character (160 byte) text line basis for storage in buffer 50 The buffer 50 is a 320 byte buffer formed of dual 180 byte buffers including a first 180 byte buffer 50-1 and a second 180 byte buffer 50-2. The first 160 byte buffer is filled with transfers from memory 3 at the column address specified by address generator 53 while the second 160 byte buffer is unloaded to provide character data to be decoded for forming the display pixels. After each cycle, the functions of the first and second 160 byte buffers are reversed.

The buffer data in buffer 50 is passed to a font memory 51 which is either a ROM or a RAM memory. The memory 51 is addressed by the encoded buffer data from the buffer 50 to produce the pixels for the text characters to be displayed. The two-byte encoded data for each character from buffer 50 addresses font memory 51 to obtain an 8×8 pixel array for that addressed character, one pixel scan line (8 bits) at a time.

The pixels for each text character scan line from the font memory 51 are aligned in the pixel preprocessor 59 and are then transferred to the pixel processor 63.

In the embodiment of FIG. 5, the display 5 of FIG. 1 is a liquid crystal display (LCD). In that embodiment, the timing required for an LCD display is generated in the LCD timer 62 in the form of the LCD CLOCKS signals. One of those signals is the charge modulation signal (M signal) which is typically applied to alternate the polarity of the driving signal to each pixel element. The timer 62 also includes a clock generator 66 for generating the timing signals used by the display controller of FIG. 5.

Also, depending upon the manufacturer's requirements for the LCD display 5, the power sequencing required for the display is controlled by the LCD sequencer 64.

The DISP DATA bus from register output 61, the LCD CLOCKS bus from LCD timer 62, and the LCD POWER bus from LCD sequencer 64 connect to the display 5 of FIG. 1.

In FIG. 5, in order to signal the type of display 5 connected to the display controller of FIG. 5, the type of display is stored in the register 57.

In text mode, the internal line buffer 50 is updated once every character line (25 times per one frame cycle). In graphics mode, the line buffer 50 must be updated every raster line (200 times per frame or 400 times per frame).

The computer 1 supports ROM or RAM based character fonts stored internally to the display controller of FIG. 5 in the internal store 51 or RAM based character fonts located in external display memory 3. Character fonts are stored internally to the display controller of FIG. 5 when the internal memory 51 is located on the same semiconductor chip as display controller 4.

For ROM based character fonts, the BUFFER DATA outputs 51 of the line buffer 50 are used to address one of the font bit maps stored in ROM in internal memory 51. This operation eliminates the requirement for external memory cycles to fetch font bit maps from external memory 3.

Figure 6:
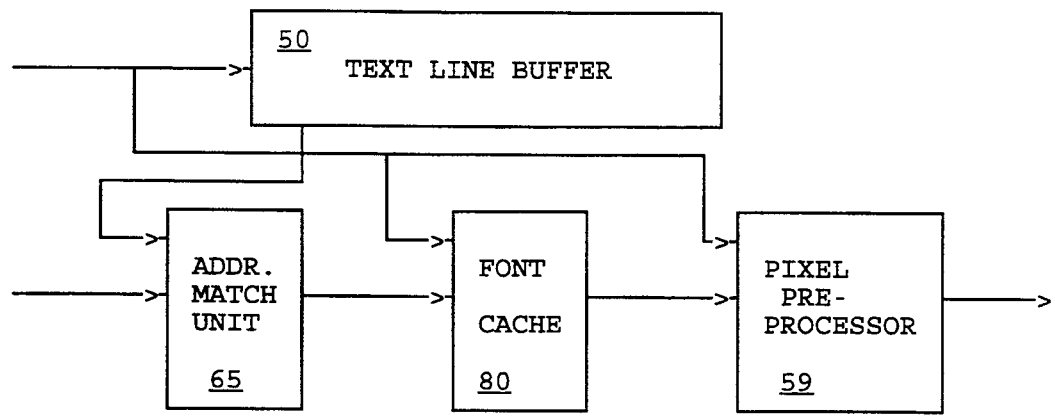
FIG. 6 depicts a modification of the FIG. 2 display controller incorporating a font cache.

Font Cache—FIG. 6

In FIG. 6, the line buffer 50 and the pixel preprocessor 59 are the same as in FIG. 5. In FIG. 6, the address/match unit 65 and font cache 80 are used to store fonts accessed from memory 3.

For RAM based character fonts, computer 1 utilizes font bit map cache 80 to select font bit maps. The selection of font bit maps stored in the cache 80 is by address/match unit 80 under control of software programs allowing frequently accessed character fonts to reside in cache 80 internal to the display controller of FIG. 5. During display refresh cycles, when a cache hit occurs, that character's font bit map (pixel array) is read from the internal cache 80 and an external memory access to memory 3 or other devices is not required. When a miss occurs, the HIT/MISS line from address/match unit 65 signals the missing font bit map to the address generator 53 of FIG. 5.

By determining the probability of occurrence for a set of characters within a particular national character set, and then programming the font bit map cache for the characters with the highest frequency of occurrence, a significant performance gain can be obtained with a relatively small cache (as compared to the size of the RAM required to store the bit maps for the entire character set). As a result, power consumption is reduced and bus bandwidth requirements are eased.

In one particular example, the ten highest frequency of occurring letter bit maps are stored in font cache 80, that is, for letters E, T, A, O, N, R, I, S and D. Also, the character for a "space" is stored in the font cache 80. The other font bit maps are stored in memory 3 and accessed when needed.

| Typical Frequency of Occurrence of Letters in English | | | | | |
| --- | --- | --- | --- | --- | --- |
| Letter | Frequency | Letter | Frequency | Letter | Frequency |
| E | 13.1% | D | 3.8% | W | 1.4% |
| T | 10.5 | L | 3.4 | B | 1.4 |
| A | 8.6 | F | 2.9 | V | .91 |
| O | 8.0 | C | 2.8 | K | .4 |
| N | 7.1 | M | 2.5 | X | .16 |
| R | 6.8 | U | 2.5 | J | .13 |
| I | 6.3 | G | 1.9 | Q | .12 |
| S | 6.1 | Y | 1.9 | Z | .07 |
| H | 5.3 | P | 1.9 | | |

Figure 7:
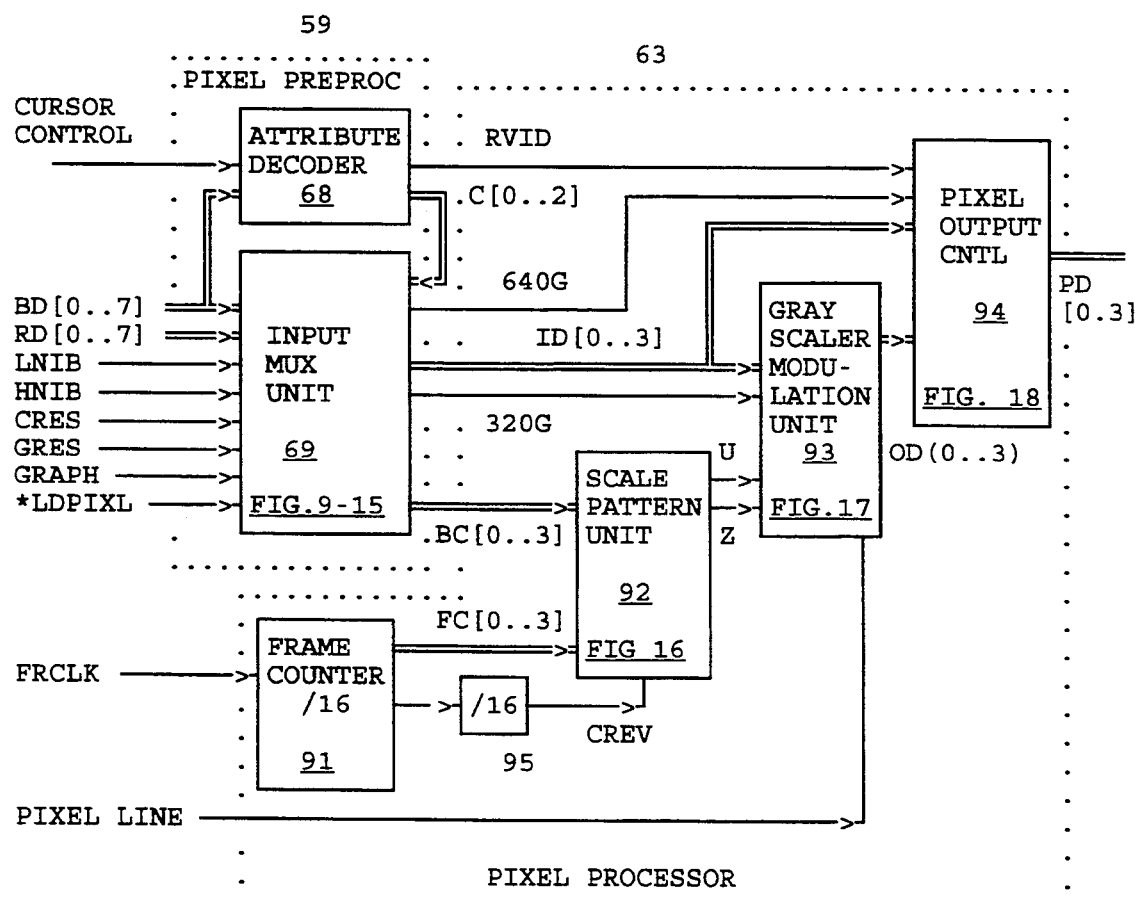
FIG. 7 depicts a pixel preprocessor and a pixel processor which form a part of the display controller of FIG. 5.

Pixel Preprocessor And Pixel Processor—FIG. 7

In FIG. 7, the pixel preprocessor 59 and the pixel processor 63 of FIG. 5 are shown in further detail. These processors function to provide frame modulation to convert the CGA color codes into gray levels. Each color is represented in a gray scale by a percentage of pixel on time. The ability to change the modulation rate provides a method of optimizing the appearance of the gray scale on different LCD panels.

The pixel preprocessor 59 selects the RAW DATA, RD[0..7], from the font ROM 51 in FIG. 5 or the BUFFER DATA, BD[0..7], from the line buffer 50 of FIG. 5 as a function of the MODE signals from the registers 57 or 58 of FIG. 5.

The selected processed data, ID[0..3], from the pixel preprocessor 59 is input to the gray scaler unit 93. The gray scaler unit 93 modulates the data with the U and Z signals from the scale pattern unit 92. The modulated output, OD[0..3], from the gray scaler unit 93 is output to the pixel output control 94 which provides the output pixel data, PD[0..3].

Pixel Preprocessor. In FIG. 7, the pixel preprocessor 59 serves two main functions; decoding the character attributes in the attribute decoder 68 and multiplexing the input data to the pixel processor by operation of the input multiplexer unit 69.

Attribute Decoder. The attribute decoder 68 receives the CGA attribute byte from the BUFFER DATA, BD[0..7], of the line buffer 50 of FIG. 5, and decodes the attributes according to the following table:

| BD[7...0]<br>76543210 | BIT<br>5 | Attribute |
|---|---|---|
| XXXX1XXX | X | Enhance |
| X000X000 | X | Non-display (blank) |
| 1XXXXXXX | 1 | Blink |
| X111X000 | X | Reverse video |
| See text | X | Non-display (block) |

Attribute bit BD[3] indicates foreground intensity, and if BD[3] is true the character will be displayed using the enhanced character set. BD[7] indicates blinking when mode select bit, bit 5 (BLINK) of private register 57 of FIG. 5, is set, or "background intensity" when cleared. BD[4 . . 6] indicate "background color" and BD[0 . . 2] indicate "foreground color".

The attribute bits are used to display the characters with shading (gray-scaling). The foreground attribute bits BD[3 . . 0] are compared to the background attribute bits BD[7..4]when bit 5 of register 57 is not true. When bit 5 of register 57 is true, then BD[3] and BD[7] are not compared. The foreground color attribute bits are each logically OR'ed with their corresponding background bits to form a 3 bit code, CL[0 . . 2]. The character is displayed using the shading value corresponding to that code. The background is not shaded. If the attribute bits are equal and nonzero, the character is displayed as a solid shaded block (8×8). If the foreground bits are less than the background, the final pixel output is inverted after shading has been applied (background is reversed and foreground is shaded and then reversed).

Input Multiplexer (MUX). The function of the input multiplexer unit 69 in FIG. 7 is to convert the 8-bit input byte, RD[0 . . . 7], into 4-bit nibbles, ID[0 . . 3]. In the text modes, this input byte is the RAW DATA, RD[0 . . 7], from the font ROM 51 of FIG. 5. In 640×200 graphics modes, this input byte is the pixel data. In 320×200 graphics mode, the input byte is the color information, CL[0 . . 3], for each pixel.

The multiplexer unit 69 is a gate array or equivalent logic device. In a typical embodiment, the unit 69 has three logical configurations as represented by FIGS. 9 and 10, FIGS. 11, 12 and 13, and FIGS. 14 and 15. The unit 69 is configured to operate in the following modes:
1. 640×200 graphics, 80×25 text (80COL)
2. 40×25 text (40COL)
3. 320×200 graphics (320G)

Figure 9:
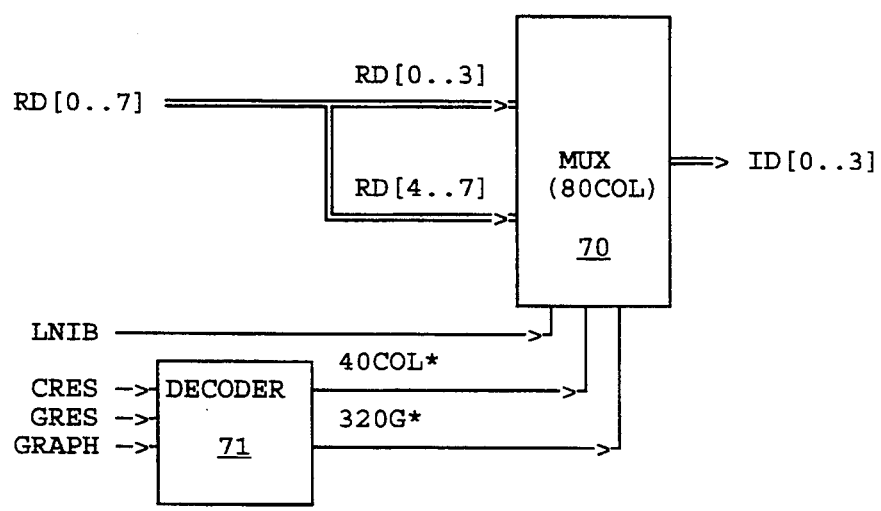
FIG. 9 depicts a block diagram representative of the input multiplexer unit 69 of FIG. 7 in one mode of operation.
Figure 10:
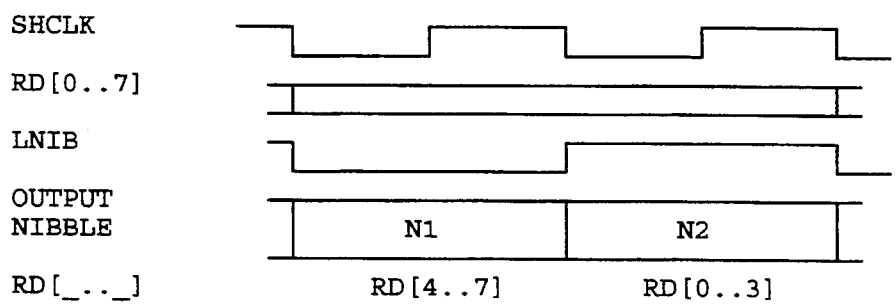
FIG. 10 depicts timing diagrams representative of the operation of the input multiplexer unit 69 in the FIG. 9 mode of operation.

Referring to FIGS. 9 and 10 and the 80COL mode 1, the input byte, RD[0 . . 7], is converted into two nibbles, N1 having bits RD[4 . . 7 ] and N2 having bits RD[0 . . 3] under control of the LNIB signal as shown in FIG. 9 and FIG. 10.

Referring to FIGS. 11, 12 and 13 and the 40COL mode 2, the input byte, RD[0 . . 7], is converted into four nibbles N1, N2, N3, and N4 under control of the LNIB and HNIB signals as represented in FIGS. 11, 12 and 13. The four nibbles are required because in 40×25 a row of data on a CRT has only 320 dots For an LCD these 320 dots must be converted into 640 dots. This means output bits 0 and 1 have the same data, bits 2 and 3 the same data, and so forth as indicated in FIG. 12 and FIG. 13.

Figure 14:
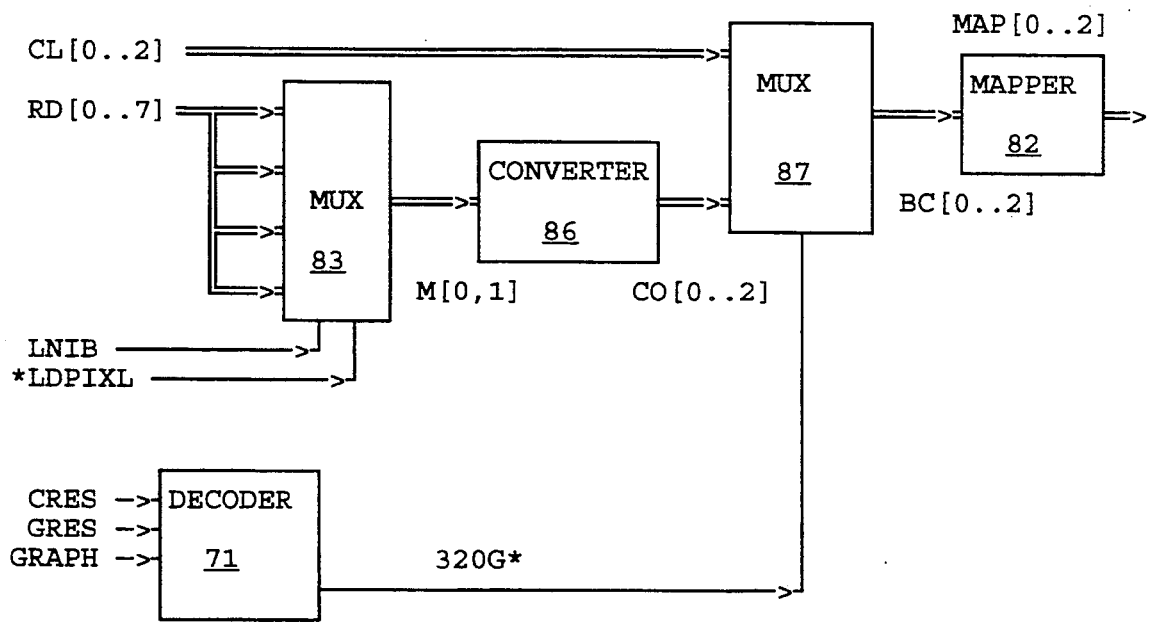
FIG. 14 depicts a block diagram representative of the input multiplexer unit 69 of FIG. 7 in another mode of operation.
Figure 15:
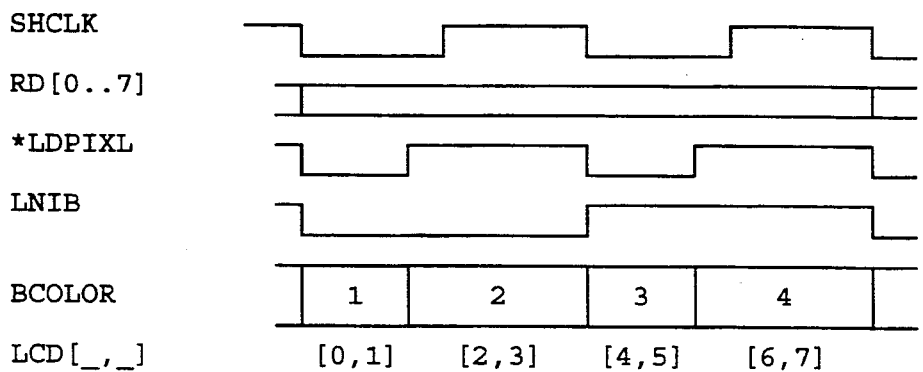
FIG. 15 depicts timing diagrams representative of the operation of the input multiplexer unit 69 in the FIG. 14 mode of operation.

Referring to FIGS. 14 and 15 and the 320 graphics mode 3, the input byte, RD[0 . . 7], is the color information for each pixel (each pixel requires two bits to select 1 of 4 colors). The input data is not multiplexed to the nibble outputs but instead is used to create shaded pixels. The incoming data is broken into four groups of 2 bits each by multiplexer 83. Each group of two represents a pixel. These 2 bits, M[0,1], are passed through a converter 86 which converts them into a three bit gray scale code. The output of this converter 86 is the 3-bit signal CO[0 . .2]. The converter 86 performs the following conversion:

| M1 | M0 | BC2 | BC1 | BC0 |
|---|---|---|---|---|
| 0 | 0 | 0 | 0 | 0 |
| 0 | 1 | 0 | 1 | 0 |
| 1 | 0 | 1 | 0 | 0 |
| 1 | 1 | 1 | 1 | 1 |

In modes 1 and 2, multiplexer 87 under control of the 320G* signal selects the unmodified color information, CL[0 . . 2], from the attribute decoder 68 of FIG. 7 to provide the BC[0 . . 2] signal. In mode 3, the multiplexer 87 under control of the 320G* signal selects the CO[0 . . 2] signal from converter 86 to provide the BC[0 . . 2] signal.

The BC[0 . .2] signal is input to mapper 82. The mapper 82 maps the color input to a shade of gray and provides an output to the scale pattern unit 92 of FIG. 16.

In 320×200 graphics mode, the display 5 is a CRT that requires color data for 320 pixels. Since the LCD has 640 pixels, the gray scale logic doubles the 320 pixels to get 640 pixels.

Frame Counter. The pixel processor 63 of FIG. 7 includes a frame counter 91 which is used as the time base to establish the frame set and to increment through the U/Z patterns. The frame counter 91 is a 4-bit divide-by-16 counter clocked by the FRCLK signal from the LCD timer 62 of FIG. 5. FRCLK is active at the start of each LCD frame (an entire LCD screen worth of data). The frame counter 91 provides the frame count, FC[0 . . 3], to control the scale pattern unit 92. The divide-by-16 counter 95 counts every 16 frames and then provides the CREV reverse signal to the scale pattern unit 92 so as to reverse the U and Z values every 256 frames.

Figure 16:
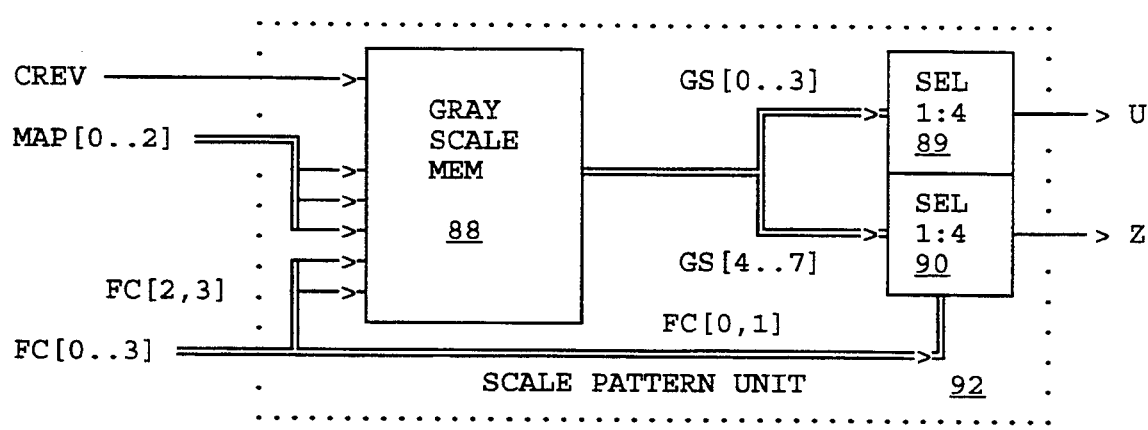
FIG. 16 depicts a block diagram of the scale pattern unit of the FIG. 7 pixel processor.

Scale Pattern Unit. In FIG. 16, further details of the scale pattern unit 92 of FIG. 7 are shown. The scale pattern unit 92 includes a gray scale memory 88 for storing U and Z patterns and dual, 1 of 4 selectors 89 and 90 for selecting bits from 4-bit fields of each of the U and Z patterns a bit at a time. These selectors 89 and 90 convert the U/Z data from the gray scale memory 88 into single bit streams of U data and single bit streams of Z data. These selectors 89 and 90 are controlled by bits FC[0] and FC[1] of the frame counter. Bits FC[0] and FC[1] count through a count of 4. For the first count of 4, the U values $u_4$, $u_3$, $u_2$, $u_1$ are selected one at time by selector 89. For the second count of 4, the U values $u_e$, $u_7$, $u_e$, $u_5$ are selected one at time by selector 89. For the third count of 4, the U values $u_{12}$, $u_{11}$, $u_{10}$, $u_9$ are selected one at time by selector 89. For the fourth count of 4, the U values $u_{16}$, $u_{15}$, $u_{14}$, $u_{13}$ are selected one at time by selector 89. In a similar manner, selector 90 selects the Z values.

The scale pattern unit 92 stores the patterns of U and Z in the gray scale memory 88 and these patterns are used to modulate the pixel data. A set of gray levels contains a U and Z pattern for each of the 8 primary colors used in the CGA mode of operation. For black, the pattern will be all 0's and for white all 1's. This leaves 6 colors that are converted to shading by modulating the pixel data. The pixel data is modulated at the frame rate. For this embodiment, a frame modulation rate of 16 is employed. The modulation rate can be changed by changing the ROM and the frame counter count. The U/Z data is stored in the ROM in nibble quantities.

For text modes a gray level is selected for each character. In 320×200 mode, the gray scale is selected four times for each byte of data in the video memory. In 640×200 mode, the values of RAW DATA are not relevant.

FC[0,1] select one of four sets of gray. Each set contains a full set of U and Z patterns. The different sets permit the selection of the color to gray level mapping.

The patterns are stored in 8-bit bytes and each byte has four bits of U data and four bits of Z data. Each color or gray shade requires four bytes, 16 bits for U and 16 bits for Z as follows.

| BYTE | D0 | D1 | D2 | D3 | D4 | D5 | D6 | D7 |
|---|---|---|---|---|---|---|---|---|
| FIRST | $u_1$ | $u_2$ | $u_3$ | $u_4$ | $z_1$ | $z_2$ | $z_3$ | $z_4$ |
| SECOND | $u_5$ | $u_6$ | $u_7$ | $u_8$ | $z_5$ | $z_6$ | $z_7$ | $z_8$ |
| THIRD | $u_9$ | $u_{10}$ | $u_{11}$ | $u_{12}$ | $z_9$ | $z_{10}$ | $z_{11}$ | $z_{12}$ |
| FOURTH | $u_{13}$ | $u_{14}$ | $z_{15}$ | $u_{16}$ | $z_{13}$ | $z_{14}$ | $z_{15}$ | $z_{16}$ |

The individual colors are selected by BC[0 .. 3] and the bytes of each pattern are selected by FC2 and FC3, which are the frame counter output bits. For text modes a gray level is selected for each character. In the 320×200 graphics mode, the gray scale level is selected four times for each byte of data in the video memory. In 640×200 mode, gray scale data is not used.

U/Z Patterns. The U and Z patterns stored in the scale pattern unit of FIG. 16 can be chosen by experimentation. In one example for each gray level, a set of 8-bit patterns were created that included all the possible waveforms for a gray level. Several 8-bit patterns that look best are chosen for each grey level. The best looking choices of each gray level are then combined and again the ones that look best are selected to obtain the best combination of patterns with low flicker and no phase relation.

In one embodiment, the U and Z patterns are 16 bit combinations of the 8 bit patterns. The original 8-bit pattern is repeated to obtain a 16-bit pattern where frame 0-7 equals frame 8-15. The method is illustrated as follows.

---
Original 8-bit pattern:
Frame = [7 ... 0]
U = 10111101
Z = 11100111
Final combined 16-bit pattern:
Frame = [15 ... 8] [7 ... 0]
U = 10111101 10111101
Z = 11100111 11100111
---

When modulating a pixel image, P, with patterns of U and Z, the modulated image, UZ*P, has alternate pixels modulated by either a U or Z scale pattern as follows.

UZUZ ...

ZUZU ...

UZUZ ...

If U and Z patterns have a different number of ones and zeros, for example, U having more 1's than Z has 1's, the resulting waveforms will create pixels modulated by U that are slightly darker than the pixels modulated by Z, giving the displayed character a "salt and pepper" look. An example of U/Z patterns with U having a greater number of 1's than Z has 1's is as follows for 8-bit scale patterns:

U=10111111

Z=11110101

To eliminate the "salt and pepper" look, the 8-bit U and Z patterns are combined to create 16-bit patterns of equal 1's and 0's. The Z pattern is concatenated with the U pattern and the U pattern is concatenated to the Z pattern. The result is two 16-bit patterns, one of UZ and the other of ZU. These patterns now have the same number of ones and zeros (over 16 frames) and eliminate the "salt and pepper" look.

---
Frame = [15 ... 8] [7 ... 0]
U = 10101111 10111111
Z = 11111101 11110101
---

When concatenating the 8-bit patterns, care must be taken to avoid creating U and Z patterns that differ by phase only. In the case above, the mirror images of the 8-bit U and Z patterns were used. Another problem which can result when combining patterns is an excessive length of runs of 1's or 0's. If the number of consecutive 1's or 0's become too large, the resulting shade of gray will have flicker.

One example of patterns employed to modulate the video data to create levels of gray on an LCD are in the following table.

| Gray Level | FRAME | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| [1]U1 | 0 | 0 | 0 | 0 | 0 | 0 | 0 | 0 | 0 | 0 | 0 | 0 | 0 | 0 | 0 | 0 |
| [1]Z1 | 0 | 0 | 0 | 0 | 0 | 0 | 0 | 0 | 0 | 0 | 0 | 0 | 0 | 0 | 0 | 0 |
| [1]U2 | 0 | 1 | 0 | 0 | 1 | 0 | 0 | 1 | 0 | 0 | 1 | 0 | 0 | 1 | 0 | 0 |
| [1]Z2 | 0 | 0 | 1 | 0 | 0 | 0 | 1 | 0 | 0 | 1 | 0 | 0 | 1 | 0 | 0 | 1 |
| [1]U3 | 1 | 0 | 1 | 0 | 1 | 0 | 0 | 1 | 0 | 1 | 0 | 1 | 0 | 1 | 0 | 0 |
| [1]Z3 | 0 | 1 | 0 | 1 | 0 | 1 | 0 | 1 | 0 | 0 | 1 | 0 | 0 | 1 | 0 | 1 |
| [1]U4 | 0 | 1 | 0 | 1 | 0 | 1 | 0 | 1 | 0 | 1 | 0 | 1 | 0 | 1 | 0 | 1 |
| [1]Z4 | 1 | 0 | 1 | 0 | 1 | 0 | 1 | 0 | 1 | 1 | 0 | 1 | 1 | 0 | 1 | 0 |
| [1]U5 | 1 | 0 | 1 | 1 | 0 | 1 | 1 | 0 | 1 | 1 | 0 | 1 | 1 | 0 | 1 | 1 |
| [1]Z5 | 1 | 1 | 0 | 1 | 1 | 1 | 0 | 1 | 1 | 0 | 1 | 1 | 0 | 1 | 1 | 0 |
| [1]U6 | 1 | 0 | 1 | 0 | 1 | 1 | 1 | 1 | 1 | 0 | 1 | 1 | 1 | 1 | 1 | 1 |
| [1]Z6 | 1 | 1 | 1 | 1 | 1 | 1 | 0 | 1 | 1 | 1 | 1 | 1 | 0 | 1 | 1 | 0 |
| [1]U7 | 0 | 1 | 1 | 1 | 1 | 1 | 1 | 0 | 1 | 1 | 1 | 1 | 0 | 1 | 1 | 1 |
| [1]Z7 | 1 | 1 | 1 | 1 | 1 | 1 | 1 | 1 | 1 | 0 | 1 | 1 | 1 | 0 | 0 | 1 |
| [1]U8 | 1 | 1 | 1 | 1 | 1 | 1 | 1 | 1 | 1 | 1 | 1 | 1 | 1 | 1 | 1 | 1 |

-continued

| Gray Level | FRAME | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| $^1Z8$ | 1 | 1 | 1 | 1 | 1 | 1 | 1 | 1 | 1 | 1 | 1 | 1 | 1 | 1 | 1 | 1 |

Figure 8:
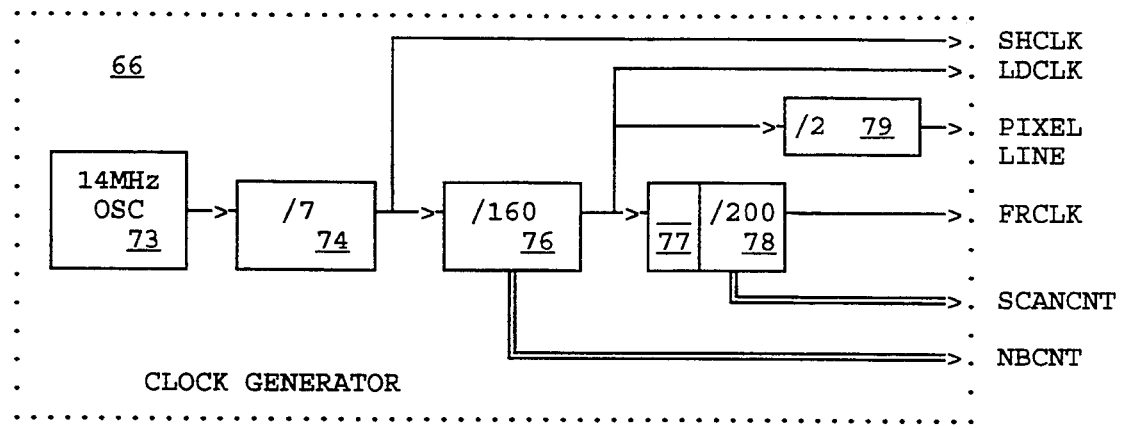
FIG. 8 depicts a block diagram of the timing clock unit within the display control unit of FIG. 5.
Figure 17:
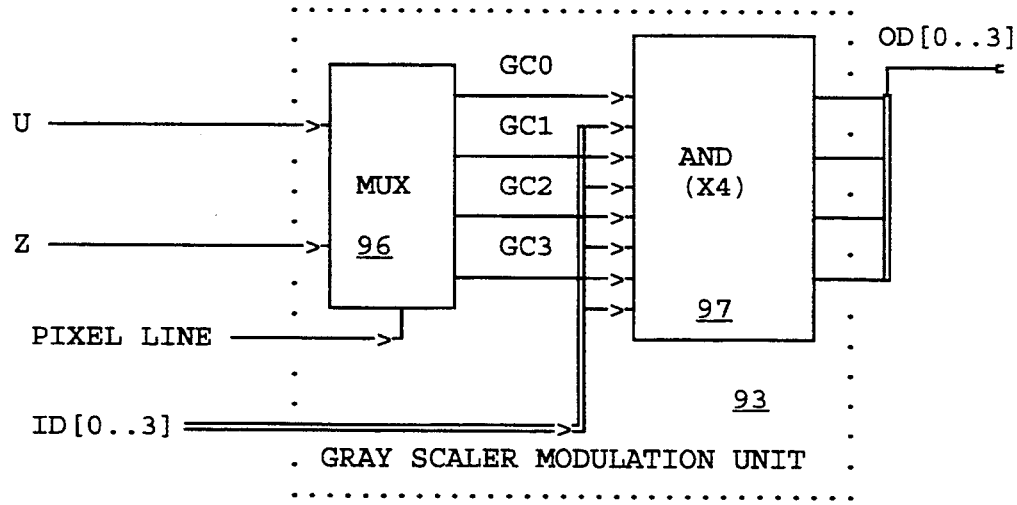
FIG. 17 depicts a block diagram of the gray scaler of the FIG. 7 pixel processor.

Gray Scaler. In FIG. 17, for text modes, the gray scaler 93 AND's the U/Z data from scale pattern unit 92 of FIG. 16 with the font data, ID[0..3], to create modulated pixel data, OD[0..3]. Data bits ID[0] and ID[2] are AND'ed with U and data bits ID[1] and ID[3] are AND'ed with Z on LINE N. On the next line of pixels, LINE N+1, the U and Z assignments are reversed under control of the PIXEL LINE signal from the timing signal generator of FIG. 8. On the next line of pixels, LINE N+2, the U and Z assignments are again reversed under control of the PIXEL LINE signal from the timing signal generator of FIG. 8 so that processing continues as follows:

| DBDA | Text modes | | | |
|---|---|---|---|---|
| | ID[0] | ID[1] | ID[2] | ID[3] |
| LINE N | U | Z | U | Z |
| LINE N + 1 | Z | U | Z | U |
| LINE N + 2 | U | Z | U | Z |

At the start of each new frame, the U/Z data is changed relative to the last frame and remains the same until the start of the next frame. With the frame counter 91 in FIG. 7 at 16, the U/Z data will be repeated every 16 frames.

In the 320 mode, the gray scaler unit 93 of FIG. 7 operates differently. There is no ID[0..3] data to be AND'ed and hence the U/Z data is output directly as the OD[0..3] data to the pixel output control 94 and as PD[0..3] to the LCD display 5 of FIG. 1. In the 320×200 mode the 320 CRT pixels must be converted into 640 LCD pixels. Normally the 2 bits of data represents a single CRT pixel. For an LCD, these same data 2 bits of data must represent 2 LCD pixels. So for each CRT pixel the U pattern drives one pixel and the Z pattern drives the other LCD pixel. In the 320×200 mode each nibble of data output from the gray scaler unit 93 is the result of two gray scale memory reads. The first input to the scale pattern unit 92 is the color information for the first 2 LCD pixels. The output from the scale pattern unit 92 is latched in the gray scaler unit 93 and the inputs to the scale pattern unit 92 are changed to the data for the second 2 LCD pixels. This second output from the scale pattern unit 92 is also latched. There is now a nibble ready to be clocked into the LCD. ID[0] and ID[1] are the U and Z of the first color and ID[2] and ID[3] are the U and Z of the second color. This is how the 320 pixels for a CRT are converted into 640 pixels for the LCD.

| OUTPUT DBDA | ID[0] | ID[1] | ID[2] | ID[3] |
|---|---|---|---|---|
| LINE N | U1 | Z1 | U2 | Z2 |
| LINE N + 1 | Z1 | U1 | Z2 | U2 |
| LINE N + 2 | U1 | Z1 | U2 | Z2 |

At the start of each frame, the U/Z data is changed and remains unchanged until the next frame.

In the text modes, the scale pattern unit AND's the U/Z data with the font data to create modulated pixel data. Data bit 0 is AND'ed with U and bit 1 is AND'ed with Z. On the next frame the U and Z assignments are reversed.

| | ID[0] | ID[1] | ID[2] | ID[3] |
|---|---|---|---|---|
| FRAME N | U | Z | U | Z |
| FRAME N + 1 | Z | U | Z | U |
| FRAME N + 2 | U | Z | U | Z |

In the 320 mode, the scale pattern unit works a little differently. There is no data to be AND'ed. Instead, the U/Z data is output directly to the LCD. Each output nibble is the result of 2 U/Z inputs from the ROM. The first input to the ROM is the color information for the first 2 pixels. The output from the ROM is latched in the scale pattern unit and the inputs to the ROM are changed to the data for the second 2 pixels. This second output from the ROM is also latched. There is now a nibble ready to be sent to the LCD. ID[0] and 1 are the U and Z for one color and ID[2] and 3 are the U and Z for another color. This is how the 320 pixels for a CRT are converted into 640 pixels for the LCD.

| OUTPUT NIBBLE | ID[0] | ID[1] | ID[2] | ID[3] |
|---|---|---|---|---|
| FRAME N | U1 | Z1 | U2 | Z2 |
| FRAME N + 1 | Z1 | U1 | Z2 | U2 |
| FRAME N + 2 | U1 | Z1 | U2 | Z2 |

In the above chart, ID[0] and ID[1] are the same color and ID[2] and ID[3] are the same color.

Figure 18:
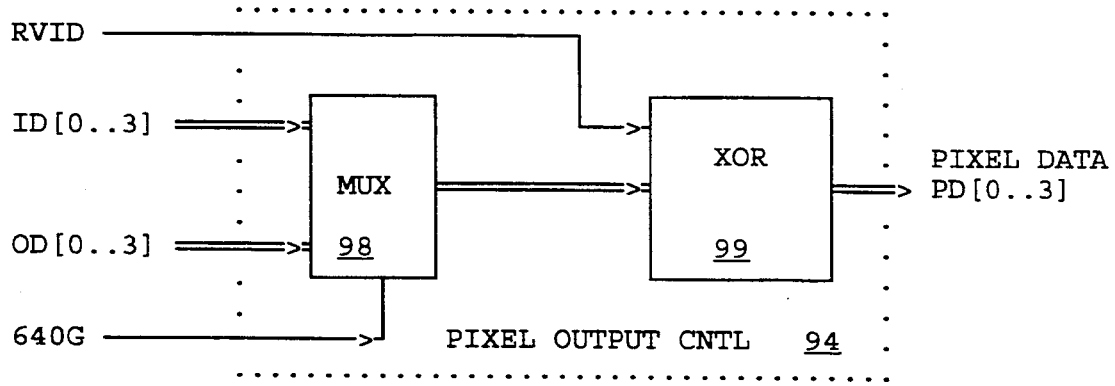
FIG. 18 depicts a block diagram of the pixel output control of the FIG. 7 pixel processor.
Figure 19:
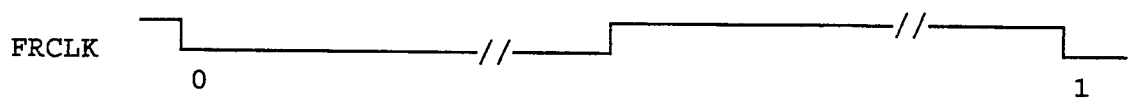
FIG. 19 depicts a timing diagram representative of the FRCLK signal from the clock unit of FIG. 8.
Figure 20:
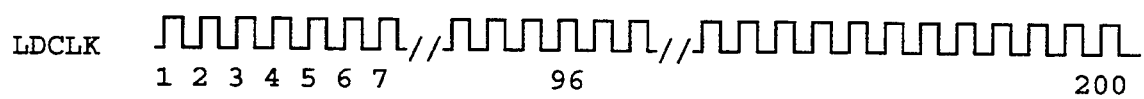
FIG. 20 depicts timing diagrams representative of the LDCLK and PIXEL LINE signals from the clock unit of FIG.
Figure 20:
Figure 21:
FIG. 21 depicts timing diagrams representative of the LDCLK signal for the 96th pulse and the SHCLK signal from the clock unit of FIG. 8.
Figure 21:
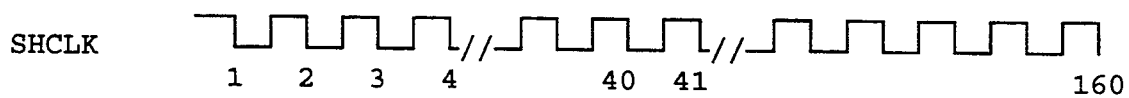
Figure 22:
FIG. 22 depicts timing diagrams representative of the signals from the gray scaler of FIG. 7.
Figure 22:
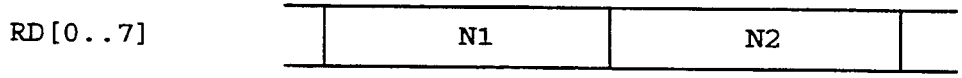
Figure 22:
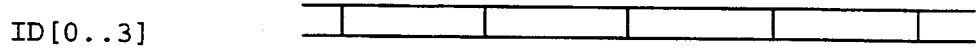
Figure 22:

Pixel Output Control. Referring to FIG. 18, the pixel output control(CNTL) 94 contains EXCLUSIVE-OR (XOR) logic 99 and the data multiplexer 98 for the 640×200 mode. In the 640×200 mode under control of the 640G signal, the data ID[0..3] is taken directly from the input multiplexer unit 69 of FIG. 1 and passed to the XOR logic 99 of FIG. 18. In all other modes the data is taken from the output OD[0..3] of the gray scaler unit 93 and is passed to the XOR logic 99. The XOR logic 99 inverts the data under control of the RVID signal from the attribute decoder 68 of FIG. 7.

Example Of Forward U/Z Patterns. The following table has a first set, $^1U/^1Z$, of scale patterns. The $^1U/^1Z$ scale patterns are a forward set of scale patterns used to modulate an image formed of pixels to obtain shades of gray for the image. In the set of scale patterns, each scale pattern is formed of a sequence of binary bits including 1's and 0's. The set includes scale patterns that have different numbers of 1's and 0's and that have sequences of 1's and 0's that are not phase related to the sequences of other scale patterns in the set. The set $^1U/^1Z$ specifically includes the scale patterns $^1U1$, $^1U2$, $^1U3$, $^1U4$, $^1U5$, $^1U6$, $^1U7$, $^1U8$, $^1Z1$, $^1Z2$, $^1Z3$, $^1Z4$, $^1Z5$, $^1Z6$, $^1Z7$, and $^1Z8$ as follows:

| Gray Level | \multicolumn{16}{c}{FRAME (f)} | | | | | | | | | | | | | | | |
|---|---|---|---|---|---|---|---|---|---|---|---|---|---|---|---|---|
|  | 16 | 15 | 14 | 13 | 12 | 11 | 10 | 9 | 8 | 7 | 6 | 5 | 4 | 3 | 2 | 1 |
| $^1Z_1$ | 0 | 0 | 0 | 0 | 0 | 0 | 0 | 0 | 0 | 0 | 0 | 0 | 0 | 0 | 0 | 0 |
| $^1U_1$ | 0 | 0 | 0 | 0 | 0 | 0 | 0 | 0 | 0 | 0 | 0 | 0 | 0 | 0 | 0 | 0 |
| $^1Z_2$ | 0 | 1 | 0 | 0 | 1 | 0 | 0 | 1 | 0 | 0 | 1 | 0 | 0 | 1 | 0 | 0 |
| $^1U_2$ | 0 | 0 | 1 | 0 | 0 | 1 | 1 | 0 | 0 | 1 | 0 | 0 | 1 | 0 | 0 | 1 |
| $^1Z_3$ | 1 | 0 | 1 | 0 | 1 | 0 | 0 | 1 | 0 | 1 | 0 | 1 | 0 | 1 | 0 | 0 |
| $^1U_3$ | 0 | 1 | 0 | 1 | 0 | 1 | 0 | 1 | 0 | 0 | 1 | 0 | 0 | 1 | 0 | 1 |
| $^1Z_4$ | 0 | 1 | 0 | 1 | 0 | 1 | 1 | 0 | 1 | 0 | 1 | 0 | 1 | 0 | 1 | 1 |
| $^1U_4$ | 1 | 0 | 1 | 0 | 1 | 0 | 1 | 0 | 1 | 1 | 0 | 1 | 1 | 0 | 1 | 0 |
| $^1Z_5$ | 1 | 0 | 1 | 1 | 0 | 1 | 1 | 0 | 1 | 1 | 0 | 1 | 1 | 0 | 1 | 1 |
| $^1U_5$ | 1 | 1 | 0 | 1 | 1 | 1 | 0 | 1 | 1 | 0 | 1 | 1 | 0 | 1 | 1 | 0 |
| $^1Z_6$ | 1 | 0 | 1 | 0 | 1 | 1 | 1 | 1 | 1 | 0 | 1 | 1 | 1 | 1 | 1 | 1 |
| $^1U_6$ | 1 | 1 | 1 | 1 | 1 | 1 | 0 | 1 | 1 | 1 | 1 | 1 | 0 | 1 | 1 | 0 |
| $^1Z_7$ | 0 | 1 | 1 | 1 | 1 | 1 | 1 | 0 | 1 | 1 | 1 | 1 | 1 | 1 | 1 | 1 |
| $^1U_7$ | 1 | 1 | 1 | 1 | 1 | 1 | 1 | 1 | 1 | 0 | 1 | 1 | 1 | 0 | 1 | 1 |
| $^1Z_8$ | 1 | 1 | 1 | 1 | 1 | 1 | 1 | 1 | 1 | 1 | 1 | 1 | 1 | 1 | 1 | 1 |
| $^1U_8$ | 1 | 1 | 1 | 1 | 1 | 1 | 1 | 1 | 1 | 1 | 1 | 1 | 1 | 1 | 1 | 1 |

The set $^1U/^1Z$ includes two groups, the $^1U$ group and the $^1Z$ group used to modulate the image P to form $^1U*P^1$ $^1Z*P^2$. For any selected gray scale, one of the $^1U$ group scale patterns is used to modulate alternate pixels $p_{i,j}$ of the image $P^1$ in the array, such as pixels $p_{1,1}$, $p_{1,3}$ and $p_{2,2}$ in the following example. A corresponding one of the $^1Z$ group scale patterns is used to modulate the remaining alternate pixels $p_{ij+1}$ of the image $P^2$ in the array, such as pixels $p_{1,2}$, $p_{2,1}$, $p_{2,3}$ in the following example. The alternating group modulation is indicted as follows:

$$\begin{array}{cccccc}
^1U*p_{1,1} & ^1Z*p_{1,2} & ^1U*p_{1,3} & \cdot & \cdot & ^1Z*p_{1,l} \\
^1Z*p_{2,1} & ^1U*p_{2,2} & ^1Z*p_{2,3} & & & \\
^1U*p_{3,1} & ^1Z*p_{3,2} & ^1U*p_{3,3} & & & \\
\cdot & & & & & \\
\cdot & & & & & \\
^1Z*p_{j,1} & ^1U*p_{l,2} & ^1Z*p_{l,3} & & & ^1U*p_{l,j}
\end{array}$$

Each of the $^1U$ scale patterns and each of the corresponding $^1Z$ scale patterns has a different number of 1's and 0's than other scale patterns in the set so as to provide different gray scale levels. $^1U_1$ and $^1Z_1$ have no 1's and 16 0's, $^1U_2$ and $^1Z_2$ have 5 1's and 11 0's, $^1U_3$ and $^1Z_3$ have 7 1's and 9 0's, $^1U_4$ and $^1Z_4$ have 9 1's and 7 0's, $^1U_5$ and $^1Z_5$ have 11 1's and 5 0's, $^1U_6$ and $^1Z_6$ have 13 1's and 3 0's, $^1U_7$ and $^1Z_7$ have 14 1's and 2 0's, and $^1U_8$ and $^1Z_8$ have 16 1's and no 0's.

The sequences of 1's and 0's for any one of the $^1U$ scale patterns is not a phase shift of any one of the $^1Z$ scale patterns. Also, the $^1U/^1Z$ set has scale patterns with both odd numbers of 1's (5, 7, 9, 11, and 13) and one with an even number of 1's (14). Any combination of odd or even numbers of 1's can be employed. However, it is preferable that scale patterns with low numbers of 1's be avoided because they tend to destroy the resolution of the modulated pixel. In the $^1U/^1Z$ set, scale patterns having only 1, 2, 3, and 4 1's are absent from the set. Further, the progression in increasing numbers of 1's from $^1U_1$ and $^1Z_1$ to $^1U_8$ and $^1Z_8$ is non-linear (0, 5, 7, 9, 11, 13, 14, 16) with more 1's toward the $^1U_8$ and $^1Z_8$ end of the range of scale patterns. This non-linearity in the distribution of 1's in the scale patterns better fits the response of the human eyes to differences in gray scale than does a linear distribution of 1's (for example, 0, 1, 2, 3, 4, 5, 6, 7, 8).

Example Gray Scale Modulation Of Character Capital, "C"

An example of a capital "C" character modulated with the $^1U_6$ and $^1Z_6$ scale patterns from the $^1U/^1Z$ set of scale patterns is represented below. The character "C" is represented in the embodiment described by an 8×8 pixel array as follows:

$$\begin{array}{cccccc}
p_{1,1} & p_{1,2} & p_{1,3} & \cdot & \cdot & p_{1,8} \\
p_{2,1} & p_{2,2} & p_{2,3} & & & \\
p_{3,1} & p_{3,2} & p_{3,3} & & & \\
\cdot & & & & & \\
\cdot & & & & & \\
p_{8,1} & p_{8,2} & p_{8,3} & & & p_{8,8}
\end{array}$$

In the 8×8 pixel array for the character "C", certain of the pixels are turned on (binary 1) as represented by "X's" in FIG. 4 to depict the shape of a character "C". Specifically, the pixels $P_{1,3}$, $P_{1,4}$, $P_{1,5}$, $P_{1,6}$ in the row 1 of FIG. 4 are turned on (binary 1) while the others in that row remain off (binary 0's). In row 2, the pixels $P_{2,2}$, $P_{2,3}$, $P_{2,6}$, and $P_{2,7}$ are on (X) while the others are off (.). Similarly, certain pixels are on or off in the pixel rows 3 through 8 as shown in FIG. 4.

The $^1U_6$ and $^1Z_6$ scale pattern modulates the pixel array for the character "C" to create a gray scale level of 13/16 over 16 frames. The modulation of the charter "C" pixel array is as follows for each frame f where f equals 1, 2, 3, ..., 16:

$$\begin{array}{cccccc}
^1U_6f*p_{1,1} & ^1Z_6f*p_{1,2} & ^1U_6f*p_{1,3} & \cdot & \cdot & ^1Z_6f*p_{1,l} \\
^1Z_6f*p_{2,1} & ^1U_6f*p_{2,2} & ^1Z_6f*p_{2,3} & & & \\
^1U_6f*p_{3,1} & ^1Z_6f*p_{3,2} & ^1U_6f*p_{3,3} & & & \\
\cdot & & & & & \\
\cdot & & & & & \\
^1Z_6f*p_{l,1} & ^1U_6f*p_{l,2} & ^1Z_6f*p_{l,3} & & & ^1U_6f*p_{l,j}
\end{array}$$

The values of $^1U_6$ for F=16 are $u_{16}$, $u_{15}$, $u_{14}$, $u_{13}$, $u_{12}$, $u_{11}$, $u_{10}$, $u_9$, $u_8$, $u_7$, $u_6$, $u_5$, $u_4$, $u_3$, $u_2$, $u_1$ which are, in the the example described, the scale pattern 1111110111110110. For $^1U_6$, $u_1$, $u_4$, and $u_{10}$ are 0's and all the others are 1's.

The values of $^1Z_6$ for F=16 are $z_{16}$, $z_{15}$, $z_{14}$, $z_{13}$, $z_{12}$, $z_{11}$, $z_{10}$, $z_9$, $z_8$, $z_7$, $z_6$, $z_5$, $z_4$, $z_3$, $z_2$, $z_1$ which are in the example described the scale pattern 1010111110111111. For $^1Z_6$, $z_7$, $z_6$, $z_{13}$, and $z_{15}$ are 0's and all the others are 1's.

The evaluation of the above pixel image modulated by $^1U6$ and $^1Z6$ over one frame f is as follows:

| | | | | | |
|---|---|---|---|---|---|
| $u_f*p_{1,1}$ | $z_f*p_{1,2}$ | $u_f*p_{1,3}$ | . | . | $z_f*p_{1,l}$ |
| $z_f*p_{2,1}$ | $u_f*p_{2,2}$ | $z_f*p_{2,3}$ | | | |
| $u_f*p_{3,1}$ | $z_f*p_{3,2}$ | $u_f*p_{3,3}$ | | | |
| . | | | | | |
| . | | | | | |
| $z_f*p_{l,1}$ | $u_f*p_{l,2}$ | $z_f*p_{l,3}$ | | | $u_f*p_{l,j}$ |

For frame f=1 (f1), the pixels $P_{1,3}$, $P_{1,4}$, $P_{1,5}$, $P_{1,6}$ in the row 1 are on (X) while the others in that row remain off (.). For frame 1 (f1), scale bit $u_1 = 0$ so that the on pixels $P_{1,3}$ and $P_{1,5}$ are modulated off by the $u_1 = 0$ scale bit; and scale bit $z_1 = 1$ so that the on pixels $P_{1,4}$ and $P_{1,6}$ are modulated to remain on.

Similarly, in row 2 for frame 1, the pixels $P_{2,2}$, $P_{2,3}$, $P_{2,6}$, and $P_{2,7}$ are on (X) while the others are off (.). For frame 1 (f 1), scale bit $z_1 = 1$ so that the on pixels $P_{2,2}$ and $P_{2,6}$ are modulated to remain on by the $z_1 = 1$ scale bit; and scale bit $u_1 = 0$ so that the on pixels $P_{2,3}$ and $P_{2,7}$ are modulated to off.

The states of the pixel image for the character "C" modulated by the $^1U6$ and $^1Z6$ scale patterns over the 16 frames of the frame set are as follows.

```
f1  . . . X . X . .     f2  . . X X X X . .
    . X . . . X . .         . X X . . X X .
    . X . . . . . .         X X . . . . . .
    . X . . . . . .         X X . . . . . .
    . X . . . . . .         X X . . . . . .
    . X . . . X . .         . X X . . X X .
    . . . X . X . .         . . X X X X . .

f3  . . X X X X . .     f4  . . . X . X . .
    . X X . . X X .         . . X . . . X .
    X X . . . . . .         . . X . . . . .
    X X . . . . . .         . . X . . . . .
    X X . . . . . .         . . X . . . . .
    . X X . . X X .         . . X . . . X .
    . . X X X X . .         . . . X . X . .

f5  . . X X X X . .     f6  . . X X X X . .
    . X X . . X X .         . X X . . X X .
    X X . . . . . .         X X . . . . . .
    X X . . . . . .         X X . . . . . .
    X X . . . . . .         X X . . . . . .
    . X X . . X X .         . X X . . X X .
    . . X X X X . .         . . X X X X . .

f7  . . . X . X . .     f8  . . X X X X . .
    . . X . . . X .         . X X . . X X .
    X . . . . . . .         X X . . . . . .
    X . . . . . . .         X X . . . . . .
    X . . . . . . .         X X . . . . . .
    . . X . . . X .         . X X . . X X .
    . . . X . X . .         . . X X X X . .

f9  . . X X X X . .     f10 . . . X . X . .
    . X X . . X X .         . . X . . . X .
    X X . . . . . .         . . X . . . . .
    X X . . . . . .         . . X . . . . .
    X X . . . . . .         . . X . . . . .
    . X X . . X X .         . . X . . . X .
    . . X X X X . .         . . . X . X . .

f11 . . X X X X . .     f12 . . X X X X . .
    . X X . . X X .         . X X . . X X .
    X X . . . . . .         X X . . . . . .
    X X . . . . . .         X X . . . . . .
    X X . . . . . .         X X . . . . . .
    . X X . . X X .         . X X . . X X .
    . . X X X X . .         . . X X X X . .

f13 . . . X . x . .     f14 . . X X X X . .
    . . X . . . X .         . X X . . X X .
    X . . . . . . .         X X . . . . . .
    X . . . . . . .         X X . . . . . .
    X . . . . . . .         X X . . . . . .
    . . X . . . X .         . X X . . X X .
    . . . X . X . .         . . X X X X . .

f15 . . . X . X . .     f16 . . X X X X . .
    . . X . . . X .         . X X . . X X .
    X . . . . . . .         X X . . . . . .
    X . . . . . . .         X X . . . . . .
    X . . . . . . .         X X . . . . . .
    . . X . . . X .         . X X . . X X .
    . . . X . X . .         . . X X X X . .
```

Charge Accumulation. When the display 5 of FIG. 1 is a an LCD display, each of the LCD pixel elements that is on is tends to accumulate a charge when the polarity of the signal driving the LCD is applied in a single direction. In order to avoid charge accumulation, a charge modulation signal (M signal) is typically applied to each pixel element. The charge modulation signal (M signal) alternates the direction of applying the driving signal. Accordingly, for a pixel element that is on, the charge accumulation for a driving signal in one direction tends to be cancelled by the charge accumulation of a driving signal in the opposite direction. Typically, the charge modulation signal reverses direction (polarity) each frame.

For a pixel, $P_{i,j}$ that is on, the polarity $m_1$ modulates the pixel over a frame set, for example, with a "+" and a "−" polarity. For $f = 1, 2, 3, \ldots, 16$, $m_f$ has a pattern, M, as follows:

$$M = + - + - + - + - + - + - + - + -$$

For a pixel that has a data value 1 for all 16 frames, the accumulated charge, AcC, accumulates to a net charge, NetC, of zero because there are an equal number of positive (8+) and negative (8−) values.

| M =      | + | − | + | − | + | − | + | − | + | − | + | − | + | − | + | − |        |
|----------|---|---|---|---|---|---|---|---|---|---|---|---|---|---|---|---|--------|
| $P_{i,j}$| 1 | 1 | 1 | 1 | 1 | 1 | 1 | 1 | 1 | 1 | 1 | 1 | 1 | 1 | 1 | 1 |        |
| AcC      | + | − | + | − | + | − | + | − | + | − | + | − | + | − | + | − | 8+, 8− |
| NetAc    | 0 |   |   |   |   |   |   |   |   |   |   |   |   |   |   |   |        |

For a pixel that has a data value 1 for all 16 frames and is modulated by a scale pattern $^1U6$ (to produce a 13/16 gray scale), the accumulated charge, AcC, accumulates to a net charge, NetC, of 1− because there are unequal numbers of positive (6+) and negative (7−) charge values shown as follows.

| M =      | + | − | + | − | + | − | + | − | + | − | + | − | + | − | + | − |        |
|----------|---|---|---|---|---|---|---|---|---|---|---|---|---|---|---|---|--------|
| $P_{i,j}$| 1 | 1 | 1 | 1 | 1 | 1 | 1 | 1 | 1 | 1 | 1 | 1 | 1 | 1 | 1 | 1 |        |
| $^1U6$   | 1 | 1 | 1 | 1 | 1 | 0 | 1 | 1 | 1 | 1 | 1 | 0 | 1 | 1 | 1 | 0 |        |
| AcC      | + | − | + | − | + |   | + | − | + | − | + |   | + | − | + |   | 6+, 7− |
| NetC     | 1−|   |   |   |   |   |   |   |   |   |   |   |   |   |   |   |        |

As indicated by the $^1U6$ example above, the charge accumulation problem arises when scale patterns are employed that can modulate with the charge modulation signal to produce an unequal number of positive and negative charges.

In order to avoid charge accumulation, inverse scale patterns are used in combination with the forward scale patterns. The forward and inverse scale patterns are alternated over charge set of frame sets. In one example, a charge set equals 16 frame sets (256 frames). Each 256 frames, the forward and inverse scale patterns are alternated to cancel charge accumulation.

Example Of Inverse U/Z Scale Patterns. The following table has $^2U/^2Z$ scale patterns which are inverses of the $^1U/^1Z$ patterns. In order to prevent charge build up on the LCD screen, the gray scale $^1U/^1Z$ patterns are employed for a charge set of frames and then the $^2U/^2Z$ patterns are employed for the next charge set of frames. In one example, a charge set equals 16 frame sets (256 frames). The switching of scale patterns from charge set to charge set is under control of the reverse signal CREV from the 16-bit counter 95 of FIG. 7.

|            | FRAME                 |
|------------|-----------------------|
| Gray       | 1 1 1 1 1 1 1         |
| Level      | 6 5 4 3 2 1 0 9 8 7 6 5 4 3 2 1 |
| $^2Z1$     | 0 0 0 0 0 0 0 0 0 0 0 0 0 0 0 0 |
| $^2U1$     | 0 0 0 0 0 0 0 0 0 0 0 0 0 0 0 0 |
| $^2Z2$     | 0 0 1 0 0 1 0 0 1 0 0 1 0 0 1 0 |
| $^2U2$     | 1 0 0 1 0 0 1 0 0 1 0 0 0 1 0 0 |
| $^2Z3$     | 0 0 1 0 1 0 1 0 1 0 0 1 0 1 0 1 |
| $^2U3$     | 1 0 1 0 0 1 0 0 1 0 1 0 1 0 1 0 |
| $^2Z4$     | 1 1 0 1 0 1 0 1 0 1 1 0 1 0 1 0 |
| $^2U4$     | 0 1 0 1 1 0 1 1 0 1 0 1 0 1 0 1 |
| $^2Z5$     | 1 1 0 1 1 0 1 1 0 1 1 0 1 1 0 1 |
| $^2U5$     | 0 1 1 0 1 1 0 1 1 0 1 1 1 0 1 1 |
| $^2Z6$     | 1 1 1 1 1 1 0 1 1 1 1 0 1 0 1 |
| $^2U6$     | 0 1 1 0 1 1 1 1 0 1 1 1 1 1 1 |
| $^2Z7$     | 1 1 1 1 1 1 1 0 1 1 1 1 1 1 1 0 |
| $^2U7$     | 1 0 1 1 1 0 1 1 1 1 1 1 1 1 1 1 |
| $^2Z8$     | 1 1 1 1 1 1 1 1 1 1 1 1 1 1 1 1 |
| $^2U8$     | 1 1 1 1 1 1 1 1 1 1 1 1 1 1 1 1 |

Example Character, Capital "C". An example of a capital "C" character modulated with the above inverse 16-bit $^2U/^2Z$ scale patterns to create gray scale levels using scale patterns $^2U6$ and $^2Z6$ is as follows.

```
f1  .  .  .  X  .  X  .  .      f2  .  .  X  X  X  X  .  .
    .  .  X  .  .  .  X  .          .  X  X  .  .  X  X  .
    .  X  .  .  .  .  .  .          .  X  X  .  .  .  .  .
    X  .  .  .  .  .  .  .          .  X  X  .  .  .  .  .
    .  X  .  .  .  .  .  .          .  X  X  .  .  .  .  .
    X  .  .  .  .  .  X  .          .  X  X  .  .  .  X  X
    .  .  .  X  .  X  .  .          .  .  X  X  X  X  .  .
    .  .  .  .  .  .  .  .          .  .  .  .  .  .  .  .

f3  .  .  X  X  X  X  .  .      f4  .  .  .  X  .  X  .  .
    .  X  X  .  .  X  X  .          .  .  X  .  .  .  X  .
    X  X  .  .  .  .  .  .          .  .  X  .  .  .  .  .
    X  X  .  .  .  .  .  .          X  .  .  .  .  .  .  .
    X  X  .  .  .  .  .  .          .  .  X  .  .  .  .  .
    .  X  X  .  .  .  X  X          X  .  .  .  .  .  .  X
    .  .  X  X  X  X  .  .          .  .  .  X  .  X  .  .
    .  .  .  .  .  .  .  .          .  .  .  .  .  .  .  .

f5  .  .  X  X  X  X  .  .      f6  .  .  X  X  X  X  .  .
```

-continued
```
         .  X  X  .  .  X  X  .            .  X  X  .  .  X  X  .
      X  X  .  .  .  .  .  .         X  X  .  .  .  .  .  .
      X  X  .  .  .  .  .  .         X  X  .  .  .  .  .  .
      X  X  .  .  .  .  .  .         X  X  .  .  .  .  .  .
         .  X  X  .  .  X  X  .            .  X  X  .  .  X  X  .
         .  .  X  X  X  X  .  .            .  .  X  X  X  X  .  .
   f7    .  .  X  .  X  .  .  .    f8     .  .  X  X  X  X  .  .
         .  X  .  .  .  X  .  .            .  X  X  .  .  X  X  .
      X  .  .  .  .  .  .  .         X  X  .  .  .  .  .  .
         .  X  .  .  .  .  .  .            X  X  .  .  .  .  .  .
      X  .  .  .  .  .  .  .         X  X  .  .  .  .  .  .
         .  X  .  .  .  X  .  .            .  X  X  .  .  X  X  .
         .  .  X  .  X  .  .  .            .  .  X  X  X  X  .  .
   f9    .  .  X  X  X  X  .  .    f10    .  .  .  X  .  X  .  .
         .  X  X  .  .  X  X  .            .  X  .  .  .  X  .  .
      X  X  .  .  .  .  .  .            .  X  .  .  .  .  .  .
      X  X  .  .  .  .  .  .            .  X  .  .  .  .  .  .
      X  X  .  .  .  .  .  .            .  X  .  .  .  .  .  .
         .  X  X  .  .  X  X  .            X  .  .  .  .  .  .  X
         .  .  X  X  X  X  .  .            .  .  .  X  .  X  .  .
   f11   .  .  X  X  X  X  .  .    f12    .  .  X  X  X  X  .  .
         .  X  X  .  .  X  X  .            .  X  X  .  .  X  X  .
      X  X  .  .  .  .  .  .         X  X  .  .  .  .  .  .
      X  X  .  .  .  .  .  .         X  X  .  .  .  .  .  .
      X  X  .  .  .  .  .  .         X  X  .  .  .  .  .  .
         .  X  X  .  .  X  X  .            .  X  X  .  .  X  X  .
         .  .  X  X  X  X  .  .            .  .  X  X  X  X  .  .
   f13   .  .  X  .  X  .  .  .    f14    .  .  X  X  X  X  .  .
         .  X  .  .  .  X  .  .            .  X  X  .  .  X  X  .
      X  .  .  .  .  .  .  .         X  X  .  .  .  .  .  .
         .  X  .  .  .  .  .  .         X  X  .  .  .  .  .  .
      X  .  .  .  .  .  .  .         X  X  .  .  .  .  .  .
         .  X  .  .  .  X  .  .            .  X  X  .  .  X  X  .
         .  .  X  .  X  .  .  .            .  .  X  X  X  X  .  .
   f15   .  .  X  .  X  .  .  .    f16    .  .  X  X  X  X  .  .
         .  X  .  .  .  X  .  .            .  X  X  .  .  X  X  .
      X  .  .  .  .  .  .  .         X  X  .  .  .  .  .  .
         .  X  .  .  .  .  .  .         X  X  .  .  .  .  .  .
      X  .  .  .  .  .  .  .         X  X  .  .  .  .  .  .
         .  X  .  .  .  X  .  .            .  X  X  .  .  X  X  .
         .  .  X  .  X  .  .  .            .  .  X  X  X  X  .  .
```

For a pixel that has a data value 1 for all 16 frames and is modulated by a scale pattern $^2U6$ (to produce a 13/16 gray scale), the accumulated charge, AcC, accumulates to a net charge, NetC, of 1+ because there are unequal numbers of positive (7+) and negative (6−) charge values shown as follows.

```
M   =   +  −  +  −  +  −  +  −  +  −  +  −  +  −  +  −
p_i,j   1  1  1  1  1  1  1  1  1  1  1  1  1  1  1  1
²U6     0  1  1  0  1  1  1  1  0  1  1  1  1  1  1  1

AcC         −  +     +  −  +  −  +        +  −  +  −  +  −   7+, 6−
NetC    1+
```

The use of the patterns $^2U6$ and $^2Z6$ alternately with the forward patterns $^1U6$ and $^1Z6$ tends to cancel the charge accumulation. The net charge accumulation for the $^1U6$ and $^1Z6$ scale patterns is NetC=1− over one frame set and the net charge accumulation for the $^2U6$ and $^2Z6$ scale patterns was NetC=1+ over one frame set so that the 1− and 1+ cancel to 0 if the forward and inverse patterns are alternated.

The actual alternation of the forward and inverse scale patterns occurs over 16 frame sets (256 frames). The forward scale patterns are used for a first frame set so that a charge of 16− accumulates and thereafter the inverse scale patterns are used for a second sequential frame set so that a charge of 16+ accumulates whereby the 61− and 16+ cancel to 0 so that no net charge accumulates.

Other Modulation Patterns. In addition to the gray scale patterns described, other modulation patterns may be employed. The scale patterns previously modulated an image P formed of two groups (P1 and P2) of adjacent pixels where UZ patterns in one pixel row followed were followed by ZU patterns in the next pixel row to form the $U*P^1 Z*P^2$ (UZ*P) modulation of the image Po The pixel groups, g(P1,P2), of pixels are as follows:

| $p_{i,j}$ | $p_{i,j+1}$ |
|---|---|
| $p_{i+1,j}$ | $p_{i+1,j+1}$ |

The pixel groups g(P1 P2) are modulated by U and Z patterns, the modulated group, g(U*P1,Z*P2) results as follows:

| $U^*p_{i,j}$ | $Z^*p_{i,j+1}$ |
| --- | --- |
| $Z^*p_{i+1,j}$ | $U^*p_{i+1,j+1}$ |

The number of pixel groups is not limited to two, however, in that any partitioning of the image P can be selected. For example, the image P can be formed of four groups, g(P1, P2, P3, P4) which in turn are modulated by the four modulation patterns H g($U^1$, $U^2$, $U^3$, $U^4$) to form the modulated image g($U^1$*P1, $U^2$*P2, $U^3$*P3, $U^4$*P4) or more generally the modulated image, g(U*)), as follows:

| $U^1{*}p_{i,j}$ | $U^2{*}p_{i,j+1}$ | $U^3{*}p_{i,j+2}$ | $U^4{*}p_{i,j+3}$ |
| --- | --- | --- | --- |
| $U^4{*}p_{i+1,j}$ | $U^1{*}p_{i+1,j+1}$ | $U^2{*}p_{i+1,j+2}$ | $U^3{*}p_{i+1,j+3}$ |
| $U^3{*}p_{i+2,j}$ | $U^4{*}p_{i+2,j+1}$ | $U^1{*}p_{i+2,j+2}$ | $U^2{*}p_{i+2,j+3}$ |
| $U^2{*}p_{i+3,j}$ | $U^3{*}p_{i+3,j+1}$ | $U^4{*}p_{i+3,j+2}$ | $U^1{*}p_{i+3,j+3}$ |

Each of the modulation patterns $U^1$, $U^2$, $U^3$, $U^4$ is formed in one example, of 16-bit scale patterns of the type previously described for U and Z where none of the internal scale patterns (excluding the external all 1's and all 0's scale patterns) is a phase shift of any of the other patterns.

The modulated image g(U*P) can be further modified by a mask group, g(C), of equal size to form a masked modulated image g[C*(U*P)] where the C* mask represents some logical operation of C on the modulated image g(U*P) and as follows:

| $c_1{*}(U^*p_{i,j})$ | $c_2{*}Z^*p_{i,j+1})$ |
| --- | --- |
| $c_3{*}Z^*p_{i+1,j})$ | $c_4{*}(U^*p_{i+1,j+1})$ | where the function g(C) is $c_1$, $c_2$, $c_3$, $c_4$ and has, for example, the following combinations:

| Mask | $c_1$ | $c_2$ | $c_3$ | $c_4$ |
| --- | --- | --- | --- | --- |
| 1 | 1 | 1 | 1 | 1 |
| 2 | 0 | 0 | 0 | 0 |
| 3 | 1 | 0 | 0 | 1 |
| 4 | 0 | 1 | 1 | 0 |

When Mask 1 is employed, there is no change in the modulated image g(U*P) if the logical function is an AND. When Mask 2 is employed, the modulated image g(U*P) is effectively turned off if the logical function is an AND. For Mask 3, the modulated pixel values (U*-$p_{i,j}$) and (U*$p_{i+1,j+1}$) are logically AND'ed with a logical one and $c_2{*}Z^*p_{i,j+1}$) and $c_3{*}Z^*p_{i+1,j}$) are logically AND'ed with a logical 0. Of course, EXCLUSIVE-OR, INVERT, OR, NAND and other logical functions can be employed.

While the invention has been particularly shown and described with reference to preferred embodiments thereof it will be understood by those skilled in the art that various changes in form and details may be made therein without departing from the spirit and scope of the invention.

We claim:

1. A display controller for controlling a display where the display provides an image as a pixel array displayed in sequential frames, where each pixel has a selectable data value in each frame, said display controller comprising, frame means for establishing a number of sequential frames as a frame set, data means for providing the data value of each of said pixels in the array to define the image, pattern means for providing modulation patterns, said patterns including patterns each formed of sequences of different numbers of both 1's and 0's that are not phase related, modulation means, operable over said number of sequential frames, for modulating the data values of pixels with said patterns whereby the intensity level of said pixels over said number of sequential frames is controlled as a function of the data value of the pixels and as a function of the patterns.

2. The display controller of claim 1 wherein said pixel array is P formed of pixels $p_{i,j}$, wherein F is the number of frames in a frame set and wherein P is represented by $P_1, P_2, \ldots, P_f, \ldots, P_F$ where $P_f$ is the value of P in each frame, f, and wherein, said pattern means provides said modulation patterns U having pattern values, $u_f$, for the frame f so that the modulated image U*P for the frame f has modulated pixel values $u_f{*}(p_{i,j})_f$ where $(p_{i,j})_f$ is the value of pixel $p_{i,j}$ for the f frame.

3. The display controller of claim 2 wherein F equals 16.

4. The display controller of claim 3 wherein said the pixel array P is partitioned into N pixel groups $P^1$, $P^2$, $\ldots$, $P^n$, $\ldots$, $P^N$ where each pixel group $P^n$ may have different values represented by $P^n_f$, in each frame, f, so that pixel groups for the pixel array P in frame f have the values $P^1_f, P^2_f, \ldots, P^n_f, \ldots, P^N_f$ and wherein, said pattern means provides the patterns U with modulation groups $U^1, U^2, \ldots, U^n, \ldots, U^N$ each group having patterns having values, $u^n_f$ for each frame f, said patterns including patterns each formed of sequences of different numbers of both 1's and 0's that are not phase related, said modulation means forms the modulated image as U*P where "*" is an operator and where U*P is expressed as $U^1{*}P^1$, $U^2{*}P^2, \ldots, U^n{*}P^n, \ldots, U^N{*}P^N$.

5. The display controller of claim 4 wherein, said pattern means provides each said modulation group $U^n$ with a set of patterns $U^n1, U^n2, \ldots, U^ng, \ldots U^nG$ where G is the number of patterns in the set for the group $U^ng$ where each pattern in a set $U^n$ has a different number of 1's and 0's to provide a different modulation and each pattern $U^ng$ in the set $U^n$ includes F pattern values $u^ng_1, u^ng_2, \ldots, u^ng_f, \ldots, U^ng_F$, said modulation means for each frame, f, forms the modulated image U*P with modulated pixel values $u^ng_f{*}(p_{i,j})^n_f$ where $(P_{i,j})^n_f$ is the data value of the pixel $P_{i,j}$ for the pixel array $P^n$ in the f frame and $u^ng_f$ is the binary 1 or binary 0 value of the $u^ng$ pattern in the f frame.

6. The display controller of claim 5 wherein N=2 and the image pixel array P is formed of pixel groups $P^1$ and $P^2$ which are modulated by modulation groups $U^1$ and $U^2$ to form the modulated image $U^1{*}P^1$, $U^2{*}P^2$.

7. The display controller of claim 6 wherein $U^2$ is represented by Z and $U^1$ is represented by U and the image P, having pixel groups $P^1$ and $P^2$ where $P^1$ is formed of pixels $P_{i,j}$ and $p_{i+1,i+1}$ and where $P^2$ is formed of adjacent pixels $P_{i,j+1}$ and $P_{i+1,j}$ and wherein, said modulation means forms the modulation $U^*P^1$, $Z,P^2$ designated as UZ*P.

8. The display controller of claim 7 wherein the $U*P^1$, $Z*P^2$ array of modulated pixels for a frame f is given as follows:

| $u_f*p_{1,1}$ | $z_f*p_{1,2}$ | $u_f*p_{1,3}$ | . | . | . | $z_f*p_{1,l}$ |
|---|---|---|---|---|---|---|
| $z_f*p_{2,1}$ | $u_f*p_{2,2}$ | $z_f*p_{2,3}$ | | | | |
| $u_f*p_{3,1}$ | $z_f*p_{3,2}$ | $u_f*p_{3,3}$ | | | | |
| . | | | | | | |
| . | | | | | | |
| $z_f*p_{l,1}$ | $u_f*p_{l,2}$ | $z_f*p_{l,3}$ | | | . | $u_f*p_{l,j}$ |

9. The display controller of claim 8 wherein the $U*P^1,Z*P^2$ array of modulated pixels for a frame set F as a function of frame f for particular scale patterns $Ug_f$ and $Zg_f$ each having gray scale modulations $Ug*P^1,Zg*P^2$ is given as follows:

| $Ug_f*p_{1,1}$ | $Zg_f*p_{1,2}$ | $Ug_f*p_{1,3}$ | . | . | . | $Zg_f*p_{1,l}$ |
|---|---|---|---|---|---|---|
| $Zg_f*p_{2,1}$ | $Ug_f*p_{2,2}$ | $Zg_f*p_{2,3}$ | | | | |
| $Ug_f*p_{3,1}$ | $Zg_f*p_{3,2}$ | $Ug_f*p_{3,3}$ | | | | |
| . | | | | | | |
| . | | | | | | |
| $Zg_f*p_{l,1}$ | $Ug_f*p_{l,2}$ | $Zg_f*p_{l,3}$ | | | | $Ug_f*p_{l,j}$ |

10. The display controller of claim 8 wherein the modulated pixel array $Ug*P^1,Zg*P^2$ is further partitioned with the modulation patterns Ug and Zg partitioned into first patterns $^1Ug$ and $^1ZUg$ which tend to cause charge accumulation of one polarity and second inverse patterns $^2Ug$ and $^2Zg$, respectively, which tend to cause charge accumulation of the opposite polarity, said frame means provides charge set reverse signal after a number of frames establishing a charge set,
   said modulation means for the pixel groups $P^1$ and $P^2$ modulates for a charge set with the first patterns lug and $^1Zg$ to form the modulated pixel array $^1Ug*P^1$, $^1Zg*P^2$ as follows:

| $^1Ug_f*p_{1,1}$ | $^1Zg_f*p_{1,2}$ | $^1Ug_f*p_{1,3}$ | . | . | . | $^1Zg_f*p_{1,l}$ |
|---|---|---|---|---|---|---|
| $^1Zg_f*p_{2,1}$ | $^1Ug_f*p_{2,2}$ | $^1Zg_f*p_{2,3}$ | | | | |
| $^1Ug_f*p_{3,1}$ | $^1Zg_f*p_{3,2}$ | $^1Ug_f*p_{3,3}$ | | | | |
| . | | | | | | |
| . | | . | . | | | |
| $^1Zg_f*p_{l,1}$ | $^1Ug_f*p_{l,2}$ | $^1Zg_f*p_{l,3}$ | | | | $^1Ug_f*p_{l,j}$ | and alternately in response to said charge set signal modulates said pixel groups $P^1$ and $P^2$ with the second patterns $^2Ug$ and $^2Zg$ to form the modulated pixel array $^2Ug*P^1$, $^2Zg*P^2$ as follows:

| $^2Ug_f*p_{1,1}$ | $^2Zg_f*p_{1,2}$ | $^2Ug_f*p_{1,3}$ | . | . | . | $^2Zg_f*p_{1,l}$ |
|---|---|---|---|---|---|---|
| $^2Zg_f*p_{2,1}$ | $^2Ug_f*p_{2,2}$ | $^2Zg_f*p_{2,3}$ | | | | |
| $^2Ug_f*p_{3,1}$ | $^2Zg_f*p_{3,2}$ | $^2Ug_f*p_{3,3}$ | | | | |
| . | | | | | | |
| . | | | | | | |
| $^2Zg_f*p_{l,1}$ | $^2Ug_f*p_{l,2}$ | $^2Zg_f*p_{l,3}$ | | | | $^2Ug_f*p_{l,j}$ | whereby the alternation of the modulated pixel array $^1Ug*P^1$, $^1Zg*P^2$ with the modulated pixel array $^2Ug*P^1$, $^2Zg*P^2$ over charge sets tends to cancel the charge accumulation to 0.

11. The display controller of claim 10 wherein the second patterns $^2Ug$ and $^2Zg$ are inverses of the first patterns $^1Ug$ and $^1Zg$, respectively.

12. The display controller of claim 10 wherein said charge set is 256 frames.

13. The display controller of claim 1 wherein,
   said frame means establishes a number of said frame sets as a charge set and provides a reverse signal after each charge set,
   said pattern means provides first and second sets of patterns, said first set of patterns tending to cause charge accumulation of one polarity, said second set of patterns tending to cause charge accumulation of the opposite polarity, said pattern means responsive to said reverse signal to switch from one of said first and second sets of patterns to the other whereby accumulated charges tend to cancel.

14. The display controller of claim 1 wherein the number of bits in said scale patterns is equal to said number of frames in a frame set.

15. The display controller of claim 1 wherein the number of frames is equal to 16 and wherein the number of bits in each scale pattern is 16.

16. The display controller of claim 1 wherein said scale pattern means stores eight scale patterns.

17. The display controller of claim 16 wherein said scale patterns include scale patterns U1, U2, U3, U4, U5, U6, U7 and U9 as follows:

| | |
|---|---|
| U1 = | 0 0 0 0 0 0 0 0 0 0 0 0 0 0 0 0 |
| U2 = | 0 1 0 0 1 0 0 1 0 0 1 0 0 1 0 0 |
| U3 = | 1 0 1 0 1 0 0 1 0 1 0 1 0 1 0 0 |
| U4 = | 0 1 0 1 0 1 1 0 1 0 1 0 1 0 1 1 |
| U5 = | 1 0 1 1 0 1 1 0 1 1 0 1 1 0 1 1 |
| U6 = | 1 0 1 0 1 1 1 1 0 1 1 1 1 1 1 1 |
| U7 = | 0 1 1 1 1 1 1 0 1 1 1 1 1 1 1 1 |
| U8 = | 1 1 1 1 1 1 1 1 1 1 1 1 1 1 1 1 |

18. The display controller of claim 6 wherein said scale patterns include scale patterns U1, U2, U3, U4, U5, U6, U7, and U8 as follows:

| | |
|---|---|
| U1 = | 0 0 0 0 0 0 0 0 0 0 0 0 0 0 0 0 |
| U2 = | 0 0 1 0 0 0 1 0 0 1 0 0 1 0 0 1 |
| U3 = | 0 1 0 1 0 1 0 1 0 0 1 0 0 1 0 1 |
| U4 = | 1 0 1 0 1 0 1 0 1 1 0 1 1 0 1 0 |
| U5 = | 1 1 0 1 1 1 0 1 1 0 1 1 0 1 1 0 |
| U6 = | 1 1 1 1 1 1 0 1 1 1 1 1 0 1 1 0 |
| U7 = | 1 1 1 1 1 1 1 1 1 1 1 0 1 1 1 0 1 |
| U8 = | 1 1 1 1 1 1 1 1 1 1 1 1 1 1 1 1 |

19. The display controller of claim 1 wherein said scale pattern means stores sixteen scale patterns.

20. The display controller of claim 19 wherein said scale patterns include scale patterns U1, U2, U3, U4, U5, U6, U7, U8, Z1, Z2, Z3, Z4, Z5, Z6, Z7, and Z8 as follows:

| | |
|---|---|
| U1 | 0 0 0 0 0 0 0 0 0 0 0 0 0 0 0 0 |
| Z1 | 0 0 0 0 0 0 0 0 0 0 0 0 0 0 0 0 |
| U2 | 0 1 0 0 1 0 0 1 0 0 1 0 0 1 0 0 |
| Z2 | 0 0 1 0 0 0 1 0 0 1 0 0 1 0 0 1 |
| U3 | 1 0 1 0 1 0 0 1 0 1 0 1 0 1 0 0 |
| Z3 | 0 1 0 1 0 1 0 1 0 0 1 0 0 1 0 1 |
| U4 | 0 1 0 1 0 1 1 0 1 0 1 0 1 0 1 1 |
| Z4 | 1 0 1 0 1 0 1 0 1 1 0 1 1 0 1 0 |
| U5 | 1 0 1 1 0 1 1 0 1 1 0 1 1 0 1 1 |
| Z5 | 1 1 0 1 1 1 0 1 1 0 1 1 0 1 1 0 |
| U6 | 1 0 1 0 1 1 1 1 0 1 1 1 1 1 1 1 |
| Z6 | 1 1 1 1 1 1 0 1 1 1 1 1 0 1 1 0 |
| U7 | 0 1 1 1 1 1 1 0 1 1 1 1 1 1 1 1 |
| Z7 | 1 1 1 1 1 1 1 1 1 1 1 0 1 1 1 0 1 |
| U8 | 1 1 1 1 1 1 1 1 1 1 1 1 1 1 1 1 |

-continued

| | |
|---|---|
| Z8 | 1 1 1 1 1 1 1 1 1 1 1 1 1 1 1 1 |

21. The display controller of claim 1 wherein a first plurality of said scale patterns having first values are used to modulate first groups of display frames, wherein a second plurality of said scale patterns having second values are used to modulate second groups of said display frames, wherein the number of frames in said first and second groups is the same, and wherein the first and second groups alternate.

22. A display controller for controlling a display where the display provides an image formed of an array of pixels repeatedly presented in sequential frames, where each pixel has a pre-determined location in the array that is the same from frame to frame, where each pixel has a selectable data value, and where the data values of pixels are modifiable in each frame, said display controller comprising, first frame means for establishing a first number of sequential frames, second frame means for establishing a second number of sequential frames where said second number is greater than said first number, data means for providing the data value of each of said pixels in an array to define the image, scale pattern means for providing a first group of scale patterns and a second group of scale patterns, said patterns including patterns each formed of sequences of different numbers of both 1's and 0's that are not phase related, said first group of scale patterns and said second group of scale patterns each having first patterns formed with particular numbers of 1's and 0's in a forward sequence and having and corresponding second patterns formed with particular numbers of 1's and 0's in an inverse sequence, modulation means, repeatedly operable over sets of said first number of sequential frames, for modulating the data value of pixels with ones of said first patterns or corresponding ones of said second patterns whereby the average intensity level of each pixel over said sets of said first number of sequential frames is controlled as a function of the data value of the pixel and as a function of the number of 1's in said ones of said first or second patterns, reversing means, operable after each set of said second number of sequential frames, for switching from one of said first patterns or said second patterns to the other of said first patterns or said second patterns, said display tending to have a charge accumulation of one polarity during one set of said second number of sequential frames and a charge accumulation of opposite polarity during a subsequent set of said second number of sequential frames whereby the charge tends to cancel.

23. The display controller of claim 22 wherein the number of bits in said scale patterns is equal to said first number of sequential frames.

24. The display controller of claim 22 wherein the first number of frames is equal to 16 and wherein the number of bits in each scale pattern is 16.

25. The display controller of claim 22 wherein the second number of frames is equal to 256.

26. The display controller of claim 22 wherein said scale pattern means stores thirty scale patterns.

27. The display controller of claim 26 wherein said scale patterns include a first set of scale patterns $^1U1$, $^1U2$, $^1U3$, $^1U4$, $^1U5$, $^1U6$, $^1U7$, $^1U8$, $^1Z1$, $^1Z2$, $^1Z3$, $^1Z4$, $^1Z5$, $^1Z6$, $^1Z7$, and $^1Z8$ as follows:

| | |
|---|---|
| $^1U1$ | 0 0 0 0 0 0 0 0 0 0 0 0 0 0 0 0 |
| $^1Z1$ | 0 0 0 0 0 0 0 0 0 0 0 0 0 0 0 0 |
| $^1U2$ | 0 1 0 0 1 0 0 1 0 0 1 0 0 1 0 0 |
| $^1Z2$ | 0 0 1 0 0 1 0 0 1 0 0 1 0 0 1 |
| $^1U3$ | 1 0 1 0 1 0 0 1 0 1 0 1 0 1 0 0 |
| $^1Z3$ | 0 1 0 1 0 1 0 1 0 0 1 0 0 1 0 1 |
| $^1U4$ | 0 1 0 1 0 1 1 0 1 0 1 0 1 0 1 1 |
| $^1Z4$ | 1 0 1 0 1 0 1 0 1 1 0 1 1 0 1 0 |
| $^1U5$ | 1 0 1 1 0 1 1 0 1 1 0 1 1 0 1 1 |
| $^1Z5$ | 1 1 0 1 1 1 0 1 1 0 1 1 0 1 1 0 |
| $^1U6$ | 1 0 1 0 1 1 1 1 1 0 1 1 1 1 1 1 |
| $^1Z6$ | 1 1 1 1 1 1 0 1 1 1 1 1 1 1 1 0 |
| $^1U7$ | 0 1 1 1 1 1 1 1 0 1 1 1 1 1 1 1 |
| $^1Z7$ | 1 1 1 1 1 1 1 1 1 1 1 0 1 1 1 0 1 |
| $^1U8$ | 1 1 1 1 1 1 1 1 1 1 1 1 1 1 1 1 |
| $^1Z8$ | 1 1 1 1 1 1 1 1 1 1 1 1 1 1 1 1 | a second set of scale patterns $^2U1$, $^2U2$, $^2U3$, $^2U4$, $^2U5$, $^2U6$, $^2U7$, $^2U8$, $^2Z1$, $^2Z2$, $^2Z3$, $^2Z4$, $^2Z5$, $^2Z6$, $^2\&$, and $^2Z8$, as follows:

| | |
|---|---|
| $^2U1$ | 0 0 0 0 0 0 0 0 0 0 0 0 0 0 0 0 |
| $^2Z1$ | 0 0 0 0 0 0 0 0 0 0 0 0 0 0 0 0 |
| $^2U2$ | 0 0 1 0 0 1 0 0 1 0 0 1 0 0 1 0 |
| $^2Z2$ | 1 0 0 1 0 0 1 0 0 1 0 0 0 1 0 0 |
| $^2U3$ | 0 0 1 0 1 0 1 0 1 0 0 1 0 1 0 1 |
| $^2Z3$ | 1 0 1 0 0 1 0 0 1 0 1 0 1 0 1 0 |
| $^2U4$ | 1 1 0 1 0 1 0 1 1 0 1 0 1 0 |
| $^2Z4$ | 0 1 0 1 1 0 1 1 0 1 0 1 0 1 0 1 |
| $^2U5$ | 1 1 0 1 1 0 1 1 0 1 1 0 1 1 0 1 |
| $^2Z5$ | 0 1 1 0 1 1 0 1 1 0 1 1 1 0 1 1 |
| $^2U6$ | 1 1 1 1 1 0 1 1 1 1 1 0 1 0 1 |
| $^2Z6$ | 0 1 1 0 1 1 1 1 0 1 1 1 1 1 1 |
| $^2U7$ | 1 1 1 1 1 1 1 0 1 1 1 1 1 1 1 0 |
| $^2Z7$ | 1 0 1 1 1 0 1 1 1 1 1 1 1 1 1 1 |
| $^2U8$ | 1 1 1 1 1 1 1 1 1 1 1 1 1 1 1 1 |
| $^2Z8$ | 1 1 1 1 1 1 1 1 1 1 1 1 1 1 1 1 |

28. The display controller of claim 22 wherein said first and second groups are represented by U and Z, respectively, and the image is represented by P, having pixel groups $P^1$ and $P^2$ where $P^1$ is formed of pixels $p_{i,j}$ and $p_{i+1,j+1}$ and where $P^2$ is formed of adjacent pixels $p_{ij+1}$ and $p_{i+1j}$ and wherein, said modulation means forms the modulation $U*P^1$, $Z*P^2$ designated as $UZ*P$.

29. The display controller of claim 28 wherein the $U*P^1$, $Z*P^2$ array of modulated pixels for a frame f is given as follows:

| | | | | | |
|---|---|---|---|---|---|
| $u_f*p_{1,1}$ | $z_f*p_{1,2}$ | $u_f*p_{1,3}$ | . | . | $z_f*p_{1,l}$ |
| $z_f*p_{2,1}$ | $u_f*p_{2,2}$ | $z_f*p_{2,3}$ | | | |
| $u_f*p_{3,1}$ | $z_f*p_{3,2}$ | $u_f*p_{3,3}$ | | | |
| . | | | | | |
| . | | | | | |
| $z_f*p_{l,1}$ | $u_f*p_{l,2}$ | $z_f*p_{l,3}$ | | | $u_f*p_{l,j}$ |

30. The display controller of claim 28 wherein the $U*P^1$, $Z*P^2$ array of modulated pixels is modulated for a frame set F, where F equals said first number, as a function of frame f for particular scale patterns $Ug_f$ and $Zg_f$ each having gray scale modulations $Ug*P^1$, $Zg*P^2$ as follows:

$$\begin{array}{cccccc}
Ug_f{*}p_{1,1} & Zg_f{*}p_{1,2} & Ug_f{*}p_{1,3} & \cdot & \cdot & Zg_f{*}p_{1,l} \\
Zg_f{*}p_{2,1} & Ug_f{*}p_{2,2} & Zg_f{*}p_{2,3} & & & \\
Ug_f{*}p_{3,1} & Zg_f{*}p_{3,2} & Ug_f{*}p_{3,3} & & & \\
\cdot & & & & & \\
\cdot & & & & & \\
Zg_f{*}p_{l,1} & Ug_f{*}p_{l,2} & Zg_f{*}p_{l,3} & & & Ug_f{*}p_{l,j}
\end{array}$$

31. The display controller of claim 28 wherein the modulated pixel array Ug*P¹,Zg*P² is further partitioned with the modulation patterns Ug and Zg partitioned into first patterns ¹Ug and ¹ZUg which tend to cause charge accumulation of one polarity and second inverse patterns ²Ug and ²Zg, respectively, which tend to cause charge accumulation of the opposite polarity, said frame means provides charge set reverse signal after a number of frames establishing a charge set, said modulation means for the pixel groups P¹ and P² modulates for a charge set with the first patterns ¹Ug and ¹Zg to form the modulated pixel array ¹Ug*P¹, ¹Zg*P² as follows:

$$\begin{array}{cccccc}
{}^1Ug_f{*}p_{1,1} & {}^1Zg_f{*}p_{1,2} & {}^1Ug_f{*}p_{1,3} & \cdot & \cdot & {}^1Zg_f{*}p_{1,l} \\
{}^1Zg_f{*}p_{2,1} & {}^1Ug_f{*}p_{2,2} & {}^1Zg_f{*}p_{2,3} & & & \\
{}^1Ug_f{*}p_{3,1} & {}^1Zg_f{*}p_{3,2} & {}^1Ug_f{*}p_{3,3} & & & \\
\cdot & & & & & \\
\cdot & & & & & \\
{}^1Zg_f{*}p_{l,1} & {}^1Ug_f{*}p_{l,2} & {}^1Zg_f{*}p_{l,3} & & & {}^1Ug_f{*}p_{l,j}
\end{array}$$

and alternately in response to said charge set signal modulates said pixel groups P¹ and P² with the second patterns ²Ug and ²Zg to form the modulated pixel array ²Ug*P¹, ²Zg*P² as follows:

$$\begin{array}{cccccc}
{}^2Ug_f{*}p_{1,1} & {}^2Zg_f{*}p_{1,2} & {}^2Ug_f{*}p_{1,3} & \cdot & \cdot & {}^2Zg_f{*}p_{1,l} \\
{}^2Zg_f{*}p_{2,1} & {}^2Ug_f{*}p_{2,2} & {}^2Zg_f{*}p_{2,3} & & & \\
{}^2Ug_f{*}p_{3,1} & {}^2Zg_f{*}p_{3,2} & {}^2Ug_f{*}p_{3,3} & & & \\
\cdot & & & & & \\
\cdot & & & & & \\
{}^2Zg_f{*}p_{l,1} & {}^2Ug_f{*}p_{l,2} & {}^2Zg_f{*}p_{l,3} & & & {}^2Ug_f{*}p_{l,j}
\end{array}$$

whereby the alternation of the modulated pixel array ¹Ug*P¹, ¹Zg*P² with the modulated pixel array ²Ug*P¹, ²Zg*P² over charge sets tends to cancel the charge accumulation to 0.

32. The display controller of claim 31 wherein the second patterns ²Ug and ²Zg are inverses of the first patterns ¹Ug and ¹Zg, respectively.

33. A computer system including a display subsystem having display memory, a display controller, and a display where said display controller controls the display where said display provides an image as a pixel array displayed in sequential frames, where each pixel has a selectable data value in each frame, said display controller further including, frame means for establishing a number of sequential frames as a frame set, data means for providing the data value of each of said pixels in the array to define the image, pattern means for providing modulation patterns, said patterns including patterns each formed of sequences of different numbers of both 1's and 0's that are not phase related, modulation means, operable over said number of sequential frames, for modulating the data values of pixels with said patterns whereby the intensity level of said pixels over said number of sequential frames is controlled as a function of the data value of the pixels and as a function of the patterns.

34. The computer system of claim 28 wherein said pixel array is partitioned into a character array and wherein said display memory stores two bytes of data for each of the characters in the character array.

35. The computer system of claim 29 having means for operating in text mode or in graphic mode, and where for each character in text mode operation, one of said two bytes per character is encoded data representing the text character and the other byte represents character attributes for the text character.

36. The computer system of claim 30 wherein said display controller includes decode means for decoding the encoded data for the text character to form the character pixels representing the character image.

37. The computer system of claim 30 wherein said display controller includes a pixel preprocessor including means for decoding the character attributes and multiplexing means for multiplexing input data as a function of the mode and includes a pixel processor for modulating the pixel data.

38. A display controller for controlling a display where the display provides an image as a pixel array displayed in sequential frames, where each pixel has a selected data value in each frame, said display controller comprising, frame means for establishing a number of sequential frames as a frame set, data means for providing the data value of each of said pixels in the array to define the image, means for providing modulation patterns, said patterns including patterns each formed of sequences of different numbers of both 1's and 0's, where said sequences are not phase related, modulation means, operable over said number of sequential frames, for modulating said pixels with said patterns whereby the intensity level of said pixels over said number of sequential frames is controlled as a function of the data value of the pixels and as a function of the patterns.

* * * * *